(12) United States Patent
Osada

(10) Patent No.: US 11,079,257 B2
(45) Date of Patent: Aug. 3, 2021

(54) ABSOLUTE ENCODER AND METHOD FOR DETERMINING ROTATION AMOUNT

(71) Applicant: MINEBEA MITSUMI Inc., Nagano (JP)

(72) Inventor: Yasuo Osada, Kawaguchi (JP)

(73) Assignee: MINEBEA MITSUMI INC., Nagano (JP)

( * ) Notice: Subject to any disclaimer, the term of this patent is extended or adjusted under 35 U.S.C. 154(b) by 123 days.

(21) Appl. No.: 16/421,712

(22) Filed: May 24, 2019

(65) Prior Publication Data

US 2019/0277668 A1 Sep. 12, 2019

Related U.S. Application Data

(63) Continuation of application No. PCT/JP2017/032734, filed on Sep. 12, 2017.

(30) Foreign Application Priority Data

Nov. 29, 2016 (JP) .............................. JP2016-231659

(51) Int. Cl.
*G01D 5/249* (2006.01)
*G01D 5/14* (2006.01)
(Continued)

(52) U.S. Cl.
CPC ............. *G01D 5/2497* (2013.01); *G01B 7/30* (2013.01); *G01D 5/145* (2013.01); *G01D 5/244* (2013.01); *H02P 6/16* (2013.01)

(58) Field of Classification Search
CPC ......... G01D 5/2497; G01D 5/145; G01B 7/30
See application file for complete search history.

(56) References Cited

U.S. PATENT DOCUMENTS 6,542,088 B1* 4/2003 Bielski ..................... G01B 7/30
250/231.13
10,655,716 B2* 5/2020 Miller ..................... F16H 57/02
(Continued)

FOREIGN PATENT DOCUMENTS

CN 101115968 A 1/2008
CN 101226066 A 7/2008
(Continued)

OTHER PUBLICATIONS

Notice of Reasons for Refusal dated Jun. 16, 2020 for corresponding Japanese Application No. 2019-112455 and English translation.
(Continued)

*Primary Examiner* — Reena Aurora
(74) *Attorney, Agent, or Firm* — Pearne & Gordon LLP

(57) ABSTRACT

The present disclosure provides an absolute encoder capable of suppressing an increase in size while securing the resolution. An encoder includes a magnet rotating integrally with at least one rotary body and a plurality of rotary sensors detecting magnetic poles of the magnet to output detection signals having sinusoidal waveforms, each sinusoidal waveform having a different phase. The at least one rotary body includes a first rotary body rotating integrally with a main shaft and a third rotary body rotating together with the rotation of the first rotary body. The absolute encoder includes an angular sensor to detect the rotational angle of the first rotary body and the magnet is arranged in the third rotary body.

9 Claims, 15 Drawing Sheets

(51) Int. Cl.
  *G01B 7/30*   (2006.01)
  *H02P 6/16*   (2016.01)
  *G01D 5/244*  (2006.01)

(56) References Cited

U.S. PATENT DOCUMENTS

| | | |
|---|---|---|
| 2002/0097044 A1 | 7/2002 | Tateishi et al. |
| 2004/0256545 A1* | 12/2004 | Stobbe .................. G01D 5/145 250/231.13 |
| 2015/0015245 A1 | 1/2015 | Inoue et al. |
| 2015/0112634 A1 | 4/2015 | Shimizu |
| 2015/0369636 A1 | 12/2015 | Deak et al. |
| 2016/0145062 A1 | 5/2016 | Kamatani |

FOREIGN PATENT DOCUMENTS

| | | |
|---|---|---|
| CN | 104246444 A | 12/2014 |
| CN | 104246444 B | 6/2016 |
| DE | 44 40 214 A1 | 5/1996 |
| JP | 58-75065 A | 5/1983 |
| JP | 04-096019 A | 3/1992 |
| JP | 11-287634 A | 10/1999 |
| JP | 2002-213910 A | 7/2002 |
| JP | 2004-077483 A | 3/2004 |
| JP | 2004-274804 A | 9/2004 |
| JP | 2007-078459 A | 3/2007 |
| JP | 2014-147262 A | 8/2014 |
| JP | 2015-081797 A | 4/2015 |
| JP | 2016-503174 A | 2/2016 |
| JP | 2016-061641 A | 4/2016 |
| JP | 2016-099232 A | 5/2016 |

OTHER PUBLICATIONS

International Preliminary Report on Patentability for corresponding International Application No. PCT/JP2017/032734 dated Jun. 4, 2019.
English translation of Written Opinion for corresponding International Application No. PCT/JP2017/032734 dated Oct. 31, 2017.
International Search Report for corresponding International Application No. PCT/JP2017/032734 dated Oct. 31, 2017.
Written Opinion for corresponding International Application No. PCT/JP2017/032734 dated Oct. 31, 2017.
Notification of Reasons for Refusal dated Mar. 19, 2019 for the corresponding Japanese Application No. 2016-231659.
Notification of Notice of Allowance dated May 1, 2019 for the corresponding Japanese Application No. 2016-231659.
Chinese Office Action dated Oct. 22, 2020 for corresponding Chinese Application No. 201780074015.4 and English translation.
Chinese Office Action dated Jun. 15, 2021 for corresponding Chinese Application No. 201780074015.4 and English translation.

* cited by examiner

ABSOLUTE ENCODER AND METHOD FOR DETERMINING ROTATION AMOUNT

CROSS REFERENCE TO RELATED APPLICATIONS

This application claims the benefit of Japanese Patent Application No. 2016-231659, filed Nov. 29, 2016, which is hereby incorporated by reference in its entirety.

BACKGROUND

Technical Field

The present disclosure relates to an absolute encoder for determining a rotation amount of an input shaft and a method for determining the rotation amount.

Background

In various control mechanical devices, there have been conventionally known rotary encoders used for detecting a position or an angle of a movable element. Such encoders include an incremental type encoder for detecting a relative position or angle and an absolute type encoder for detecting an absolute position or angle. For example, Japanese Utility Model Application Laid-Open No. 4-96019 discloses an absolute type rotary encoder for measuring, as an absolute amount in a digital manner, a rotation amount of a rotational axis for controlling motion of an automatic control device, a robot device or the like or a rotational axis for power transmission used for opening and closing a valve.

SUMMARY

The absolute encoder disclosed in Japanese Utility Model Application Laid-Open No. 4-96019 has a configuration in which a one-bit rotary sensor is attached to each of the rotational axes of multistage connected gears. These gears rotate while sequentially decreasing the respective speeds, to thereby form a one-bit counter. In such an encoder, the resolution is reduced when the number of counters is reduced. On the other hand, when the number of counters is increased to secure the resolution, the size of the encoder is increased.

The present disclosure has been made in view of the above problems, and it is an object of the present disclosure to provide an absolute encoder capable of suppressing an increase in size while securing resolution.

To solve the above-described problems, an absolute encoder of an embodiment of the present disclosure for determining the rotation amount of a main shaft over a plurality of rotations includes at least one rotary body rotating together with a rotation of the main shaft, a magnet rotating integrally with the rotary body, and a plurality of rotary sensors detecting magnetic poles of the magnet to output detection signals having sinusoidal waveforms, each sinusoidal waveform having a different phase.

According to this embodiment, the absolute encoder can determine the rotation amount of the main shaft over a plurality of rotations according to the detection signals output from the rotary sensors, the detection signals having sinusoidal waveforms, each sinusoidal waveform having a different phase.

Another embodiment of the present disclosure also provides an absolute encoder. This absolute encoder for determining the rotation amount of a main shaft over a plurality of rotations includes a first acquisition mechanism acquiring the rotational angle of a first rotary body rotating integrally with the main shaft, a second acquisition mechanism acquiring the rotational angle of a second rotary body, the second rotary body reducing the rotational speed at a first speed reduction ratio with respect to the first rotary body, a third acquisition mechanism detecting magnetic poles of a magnet, the magnet reducing the rotational speed at a second speed reduction ratio with respect to the second rotary body, and acquiring a plurality of detection signals having sinusoidal waveforms, each sinusoidal waveform having a different phase, a first determination element determining the rotational frequency of the first rotary body according to the acquired rotational angle of the second rotary body and the acquired detection signals, and a second determination element determining the rotation amount of the main shaft according to the acquired rotational angle of the first rotary body and the determined rotational frequency of the first rotary body.

Yet another embodiment of the present disclosure provides a method for determining a rotation amount. This method for determining a rotation amount of a main shaft over a plurality of rotations includes acquiring a rotational angle of a first rotary body rotating integrally with the main shaft, acquiring a rotational angle of a second rotary body, the second rotary body reducing a rotational speed at a first speed reduction ratio with respect to the first rotary body, detecting magnetic poles of a magnet, the magnet reducing a rotational speed at a second speed reduction ratio with respect to the second rotary body, acquiring a plurality of detection signals having sinusoidal waveforms, each sinusoidal waveform having a different phase, determining a rotational frequency of the first rotary body according to the acquired rotational angle of the second rotary body and the acquired detection signals, and determining a rotation amount of the main shaft according to the acquired rotational angle of the first rotary body and the determined rotational frequency of the first rotary body.

Note that any combination of the above-described components, and replacement of the components and expressions of the present disclosure among the methods, devices, systems and the like are also effective as embodiments of the present disclosure.

According to the present disclosure, it is possible to provide an absolute encoder capable of suppressing an increase in size while securing the resolution.

DETAILED DESCRIPTION

Figure 1:
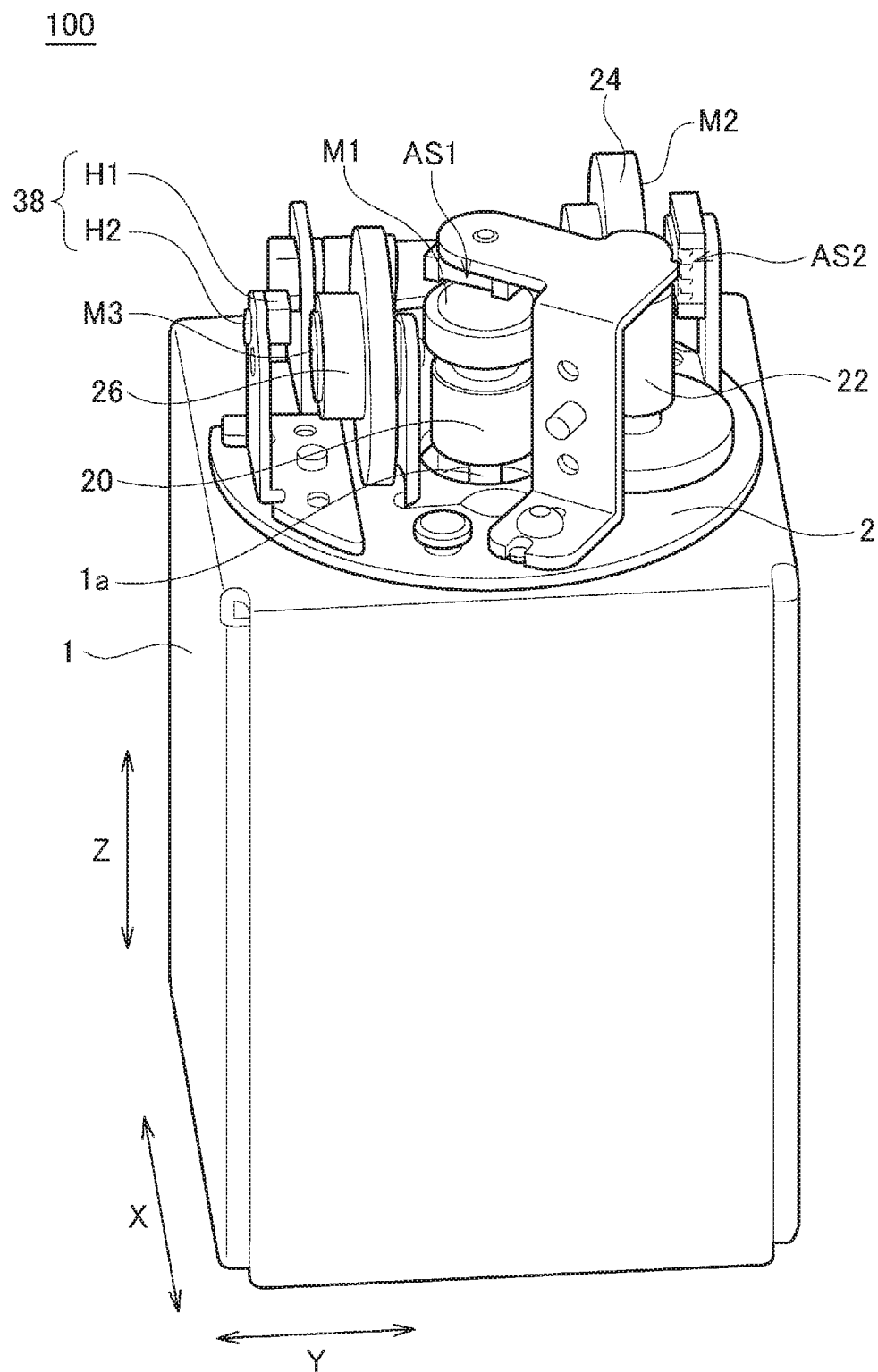
FIG. 1 is a perspective view illustrating an encoder according to an embodiment.

The present inventors have recognized an absolute encoder (hereinafter, simply referred to as an encoder) as follows. It is conceivable that an encoder is configured by being combined with a plurality of angular sensors, each detecting an absolute rotational angle within one rotation of a main shaft to output it as a digital signal, for example. As an example of a configuration of the encoder combined with a plurality of angular sensors, it is conceivable to provide the angular sensors to three shafts of a main shaft, a first driven shaft and a second driven shaft, respectively, the angular sensors being different from one another, and the first driven shaft and the second driven shaft each rotating with a speed reduction ratio different from that of the main shaft. In this configuration, the rotation amount of the main shaft over a plurality of rotations is obtained by performing a distal computation, based on rotational angles detected from the respective three shafts of the main shaft, the first driven shaft and the second driven shaft. Performing the digital computation means that an amount is computed by being converted into the base-N numbers, for example. In this configuration, since the rotation amount is calculated based on the rotational angles, the accuracy of the rotation amount obtained by the computation is decreased when the resolution of any of the rotational angles detected (hereinafter, referred to as detected rotational angles) by the plurality of angular sensors is low. To improve this accuracy, it is proposed that an angular sensor having high resolution is attached to each of these three shafts, but in this case, providing three expensive angular sensors is disadvantageous in terms of cost reduction.

In this configuration, a CPU (central processing unit) computes the rotational angles (digital signals) detected by the respective three angular sensors using complex algorithms to obtain the rotation amount. Accordingly, when a CPU having low computing power is used, the speed of the computation is insufficient, which may cause malfunction. Thus, the present inventors have recognized that there is room for improvement in a configuration in which a plurality of rotational angles are processed in parallel to determine a rotation amount, from the viewpoint of improving the accuracy while preventing cost increase.

Based on these findings, the present inventors have found that the rotation amount of the main shaft that has rotated a plurality of times (hereinafter, referred to as "a plurality of rotations") can be determined using equation 1 based on the rotational angle within one rotation of the main shaft and a rotational frequency that is the number of rotations of the main shaft.

Rotation amount of main shaft=Rotational angle of main shaft+Rotational frequency of main shaft×360°   (equation 1)

Thus, it is possible to provide an absolute encoder capable of maintaining the accuracy while preventing cost increase, by determining the rotation amount of the main shaft.

Embodiments are devised based on such findings, and specific configurations will be described below.

Preferred embodiments of the present disclosure will be now described with reference to drawings. In embodiments and variants, the same or similar components and members are denoted by the same reference numerals and their explanations will not be repeated. In addition, the dimensions of the members in each drawing are appropriately scaled for easy understanding. Moreover, in each drawing, the embodiment is described such that some of the members not important for explaining the embodiment are omitted.

It will be understood that, although the terms "first," "second," etc. may be used herein to describe various components, these terms are only used to distinguish one component from another, and these components should not be limited by these terms.

Embodiments

An encoder 100 according to an embodiment of the present disclosure will be described. FIG. 1 is a perspective view illustrating the encoder 100 according to the embodiment. The following description will be given based on an XYZ-orthogonal coordinate system. The X-axis direction corresponds to a horizontal front-rear direction, the Y-axis direction corresponds to a horizontal right-left direction, and the Z-axis direction corresponds to a vertical up-down direction. Each of the Y-axis direction and the Z-axis direction is orthogonal to the X-axis direction. The X-axis direction may be referred to as a forward direction or a rearward direction, the Y-axis direction may be referred to as a leftward direction or a rightward direction, and the Z-axis direction may be referred to as an upward direction or a downward direction. The directions thus indicated are not intended to limit the usage orientation of the encoder 100, and the encoder 100 may be used in any orientation.

Figure 2:
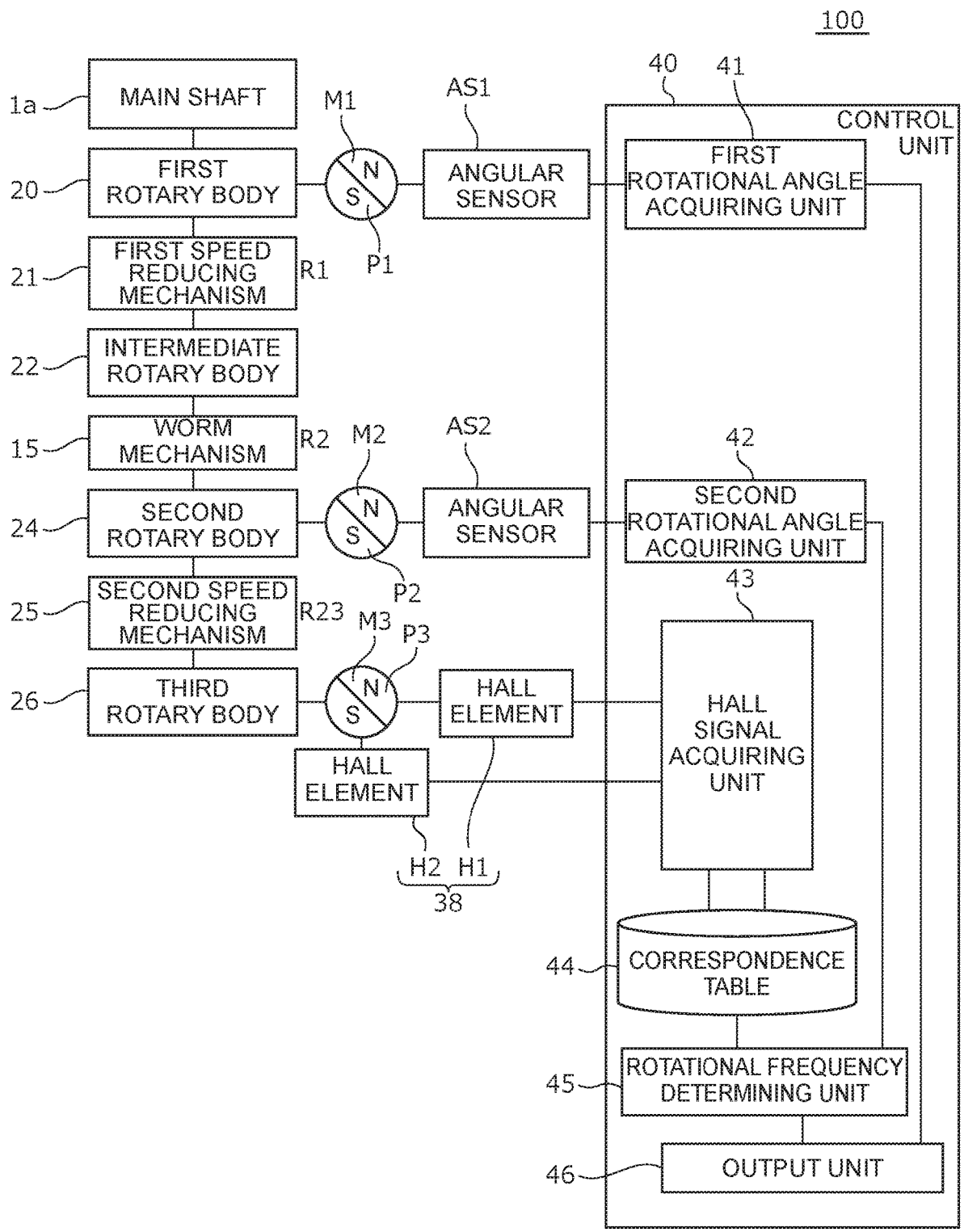
FIG. 2 is a block diagram illustrating the encoder of FIG. 1.
Figure 3:
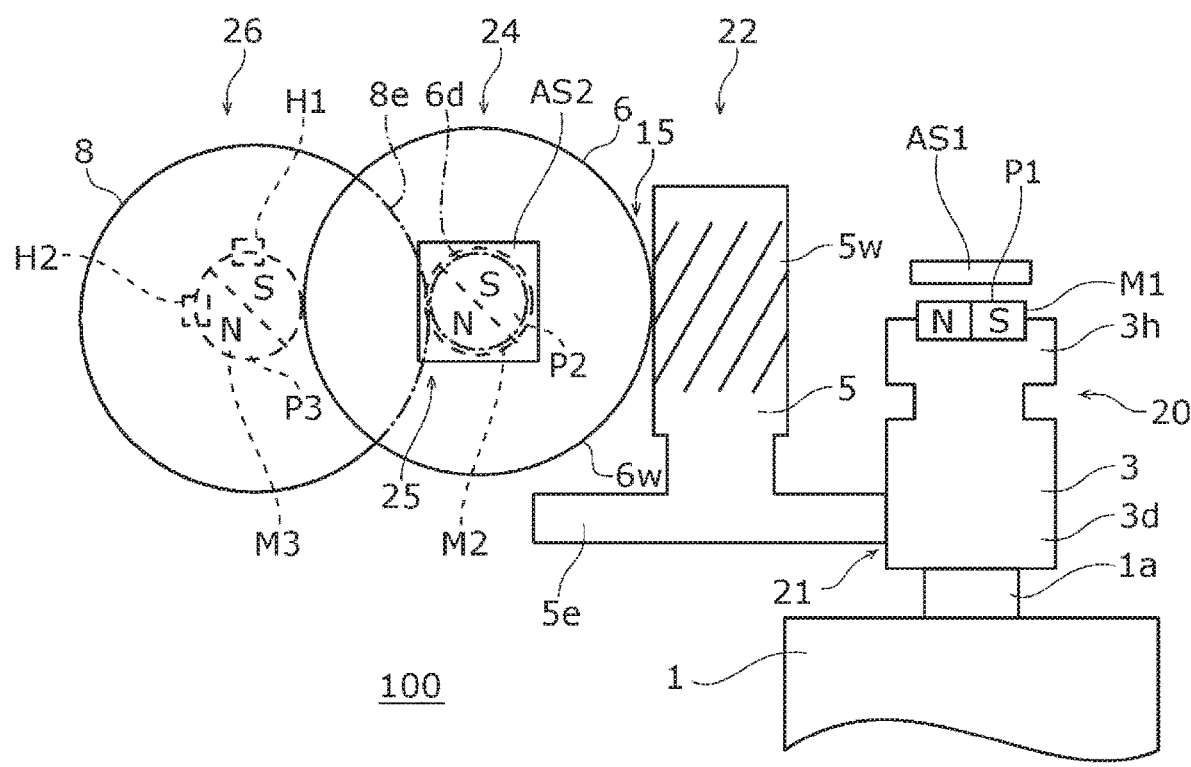
FIG. 3 is an exploded view illustrating the encoder of FIG. 1.
Figure 4:
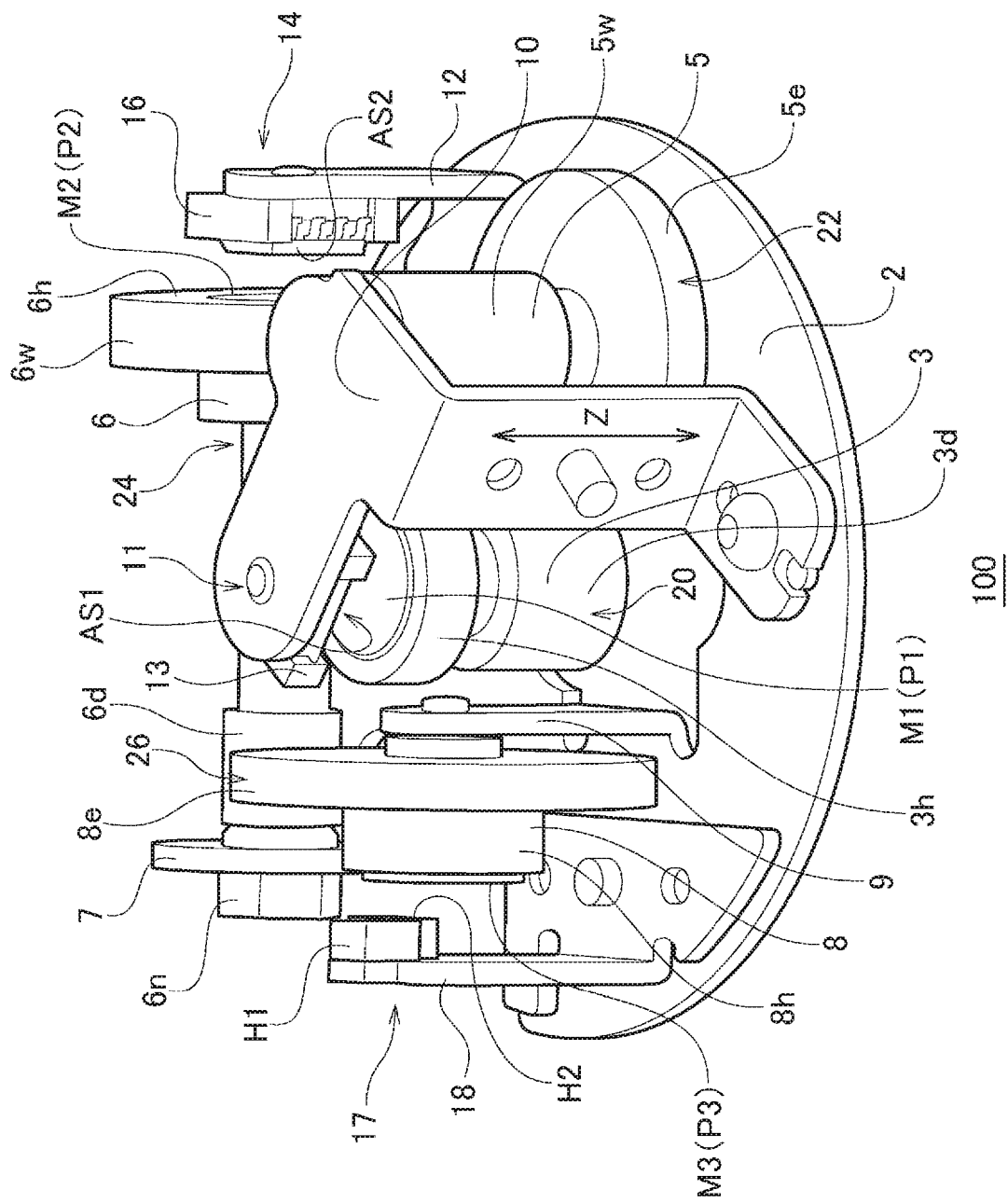
FIG. 4 is an enlarged perspective view illustrating a part of the encoder of FIG. 1.
Figure 5:
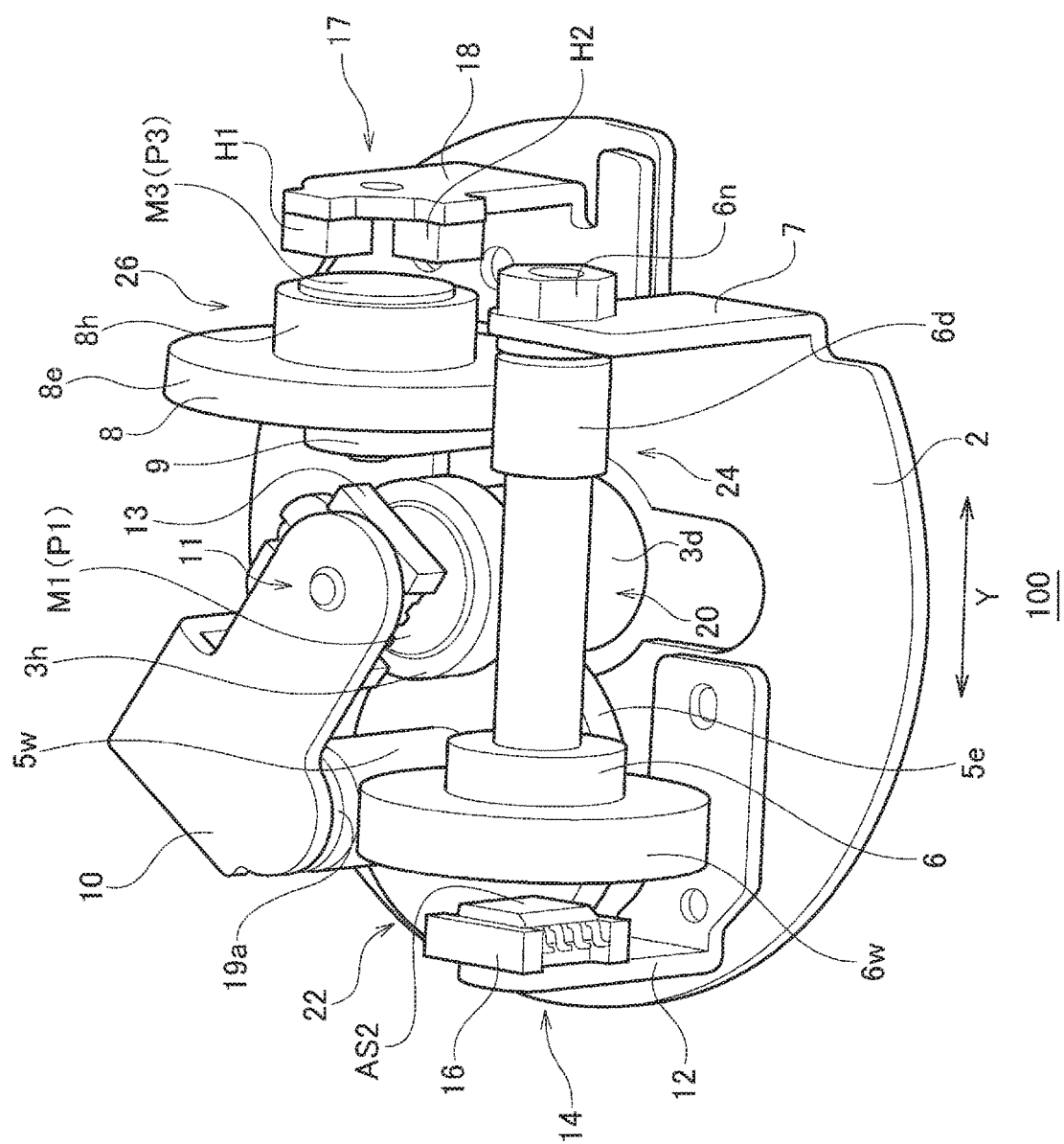
FIG. 5 is another enlarged perspective view illustrating a part of the encoder of FIG. 1.

The encoder 100 is an absolute encoder for determining and outputting the rotation amount of a main shaft $1a$ of a motor 1 over a plurality of rotations. By way of example, the motor 1 may be a stepping motor or a DC brushless motor. By way of example, the motor 1 may be applied as a drive power source for driving a robot such as an industrial robot through a speed reducing mechanism such as a wave gear device. The encoder 100 outputs the determined rotation amount of the main shaft $1a$ as a digital signal. FIG. 2 is a block diagram for illustrating the encoder 100. FIG. 3 is an exploded view illustrating the encoder 100. FIG. 4 is an enlarged perspective view illustrating a part of the encoder 100. FIG. 5 is another enlarged perspective view illustrating a part of the encoder 100.

As illustrated in FIG. 2, the encoder 100 includes the main shaft $1a$, a first rotary body 20, an intermediate rotary body 22, a second rotary body 24, a third rotary body 26, angular sensors AS1 and AS2, magnets M1, M2 and M3, a plurality of rotary sensors 38, and a control unit 40.

The main shaft $1a$ is an output shaft of the motor 1 as well as an input shaft for inputting a rotation to the encoder 100. The first rotary body 20 is fixed to the main shaft $1a$ and supported by a bearing member of the motor 1 so that the first rotary body can be rotated integrally with the main shaft $1a$. The intermediate rotary body 22, the second rotary body 24, and the third rotary body 26 are rotatably supported by a shaft described later. The intermediate rotary body 22 is driven by the first rotary body 20 through a first speed reducing mechanism 21, and the intermediate rotary body 22 reduces the rotational speed at a speed reduction ratio R1 with respect to the first rotary body 20. The second rotary body 24 is driven by the intermediate rotary body 22 through a worm mechanism 15, and the second rotary body 24 reduces the rotational speed at a speed reduction ratio R2 with respect to the intermediate rotary body 22. Assuming that the product of the speed reduction ratio R1 and the speed reduction ratio R2 is regarded as a speed reduction ratio R12, the second rotary body 24 reduces the rotational speed at the speed reduction ratio R12 with respect to the first rotary body 20. By way of example, the speed reduction ratio R1 may be 1/2, the speed reduction ratio R2 may be 1/50, and the speed reduction ratio R12 may be 1/100. These speed reduction ratios may be set according to the resolution of the encoder 100. The second rotary body 24 rotates once for every 100 rotations of the first rotary body 20.

The third rotary body 26 is driven by the second rotary body 24 through a second speed reducing mechanism 25, and the third rotary body 26 reduces a rotational speed at a speed reduction ratio R23 with respect to the second rotary body 24. By way of example, the speed reduction ratio R23 may be 1/4. The third rotary body 26 rotates once for every four rotations of the second rotary body 24. The third rotary body 26 reduces a rotational speed at a speed reduction ratio with respect to the first rotary body 20, the speed reduction ratio (=1/400) being obtained by multiplying the speed reduction ratio R23 by the speed reduction ratio R12. The third rotary body 26 rotates once for every 400 rotations of the first rotary body 20. That is, an absolute rotation amount for 400 rotations (±200 rotations) of the first rotary body 20 can be determined by determining a rotational position within one rotation of the third rotary body 26.

The magnet M1 has two magnetic poles P1 on an end surface facing the angular sensor AS1 in a rotational axis direction of the first rotary body 20. The magnet M1 rotates integrally with the first rotary body 20. The angular sensor AS1 detects the rotational angle of the first rotary body 20 (=rotational angle of the main shaft 1a) according to the magnetic flux density received from the two magnetic poles P1.

The magnet M2 has two magnetic poles P2 on an end surface facing the angular sensor AS2 in a rotational axis direction of the second rotary body 24. The magnet M2 rotates integrally with the second rotary body 24. The angular sensor AS2 detects the rotational angle of the second rotary body 24 according to the magnetic flux density received from the two magnetic poles P2.

The plurality of rotary sensors 38 include hall elements H1, H2 (hereinafter may be referred to as each hall element). Each hall element may include a thin film formed of a compound semiconductor such as gallium arsenide (GaAs) or indium antimony (InSb) or a monoatomic semiconductor such as silicon (Si). The magnet M3 has two magnetic poles P3 on an end surface facing each hall element in an axial direction of the third rotary body 26. The hall elements H1, H2 are arranged at positions apart from each other by an electric angle of $\pi/2$. The hall elements H1 and H2 output detection signals having sinusoidal waveforms with a phase difference of 90° with each other, when the magnet M3 rotates integrally with the third rotary body 26. Note that the signal having a sinusoidal waveform is not limited by the above-described denomination, and refers to a signal having a waveform in which the amplitude gradually changes over time, but does not include a signal having a rectangular waveform in which the amplitude abruptly or discontinuously changes. Examples of a signal having a sinusoidal waveform include a signal including harmonics that does not substantially affect the accuracy of the encoder, such as a signal referred to as a triangular wave.

The control unit 40 acquires the rotational angle of the first rotary body 20 detected by the angular sensor AS1, the rotational angle of the second rotary body 24 detected by the angular sensor AS2, and detection signals from the respective hall elements H1, H2. The control unit 40 determines the rotational frequency of the second rotary body 24 with reference to a correspondence table 44 according to the detection signals acquired from the respective hall elements H1, H2. The control unit 40 determines the rotational frequency of the first rotary body 20 based on the acquired rotational angle of the second rotary body 24 and the determined rotational frequency of the second rotary body 24. The rotational frequency of the first rotary body 20 can be determined using equation 2, for example.

$$\text{Rotational frequency of the first rotary body } 20 = \text{Rotational angle of the second rotary body } 24/(R12 \times 360) + \text{Rotational frequency of the second rotary body } 24/R12 \quad \text{(equation 2)}$$

The control unit 40 determines the rotation amount of the first rotary body 20 based on the determined rotational frequency of the first rotary body 20 and the acquired rotational angle of the first rotary body 20. The rotation amount of the first rotary body 20 can be determined using equation 3, for example.

$$\text{Rotation amount of the first rotary body } 20 = \text{Rotational angle of the first rotary body } 20 + \text{Rotational frequency of the first rotary body } 20 \times 360° \quad \text{(equation 3)}$$

Since the rotation amount of the main shaft 1a is equal to the rotation amount of the first rotary body 20, the rotation amount of the main shaft 1a can be determined using equation 4, for example.

$$\text{Rotation amount of the main shaft } 1a = \text{Rotational angle of the first rotary body } 20 + \text{Rotational frequency of the first rotary body } 20 \times 360° \quad \text{(equation 4)}$$

Subsequently, each element of the encoder 100 will be described.

(Control Unit)

As illustrated in FIG. 2, the control unit 40 includes a first rotational angle acquiring unit 41, a second rotational angle acquiring unit 42, a hall signal acquiring unit 43, the correspondence table 44, a rotational frequency determining unit 45, and an output unit 46. Each of these blocks can be implemented in hardware such as elements like a CPU (central processing unit) of a computer or mechanical devices, and in software such as a computer program, etc. FIG. 2 illustrates functional blocks implemented by the cooperation of these elements. Therefore, it should be understood by those skilled in the art reading this specification that these functional blocks may be implemented in a variety of manners by a combination of hardware and software.

The first rotational angle acquiring unit 41 acquires the rotational angle of the first rotary body 20 detected by the angular sensor AS1. The second rotational angle acquiring unit 42 acquires the rotational angle of the second rotary body 24 detected by the angular sensor AS2. The hall signal acquiring unit 43 acquires detection signals having sinusoidal waveforms from the hall elements H1, H2. The hall signal acquiring unit 43 includes an AD converter, for example, and therefore converts the detection signals of analog signals acquired from the hall elements H1, H2 to digital detection signals.

(Correspondence Table)

Figure 6:
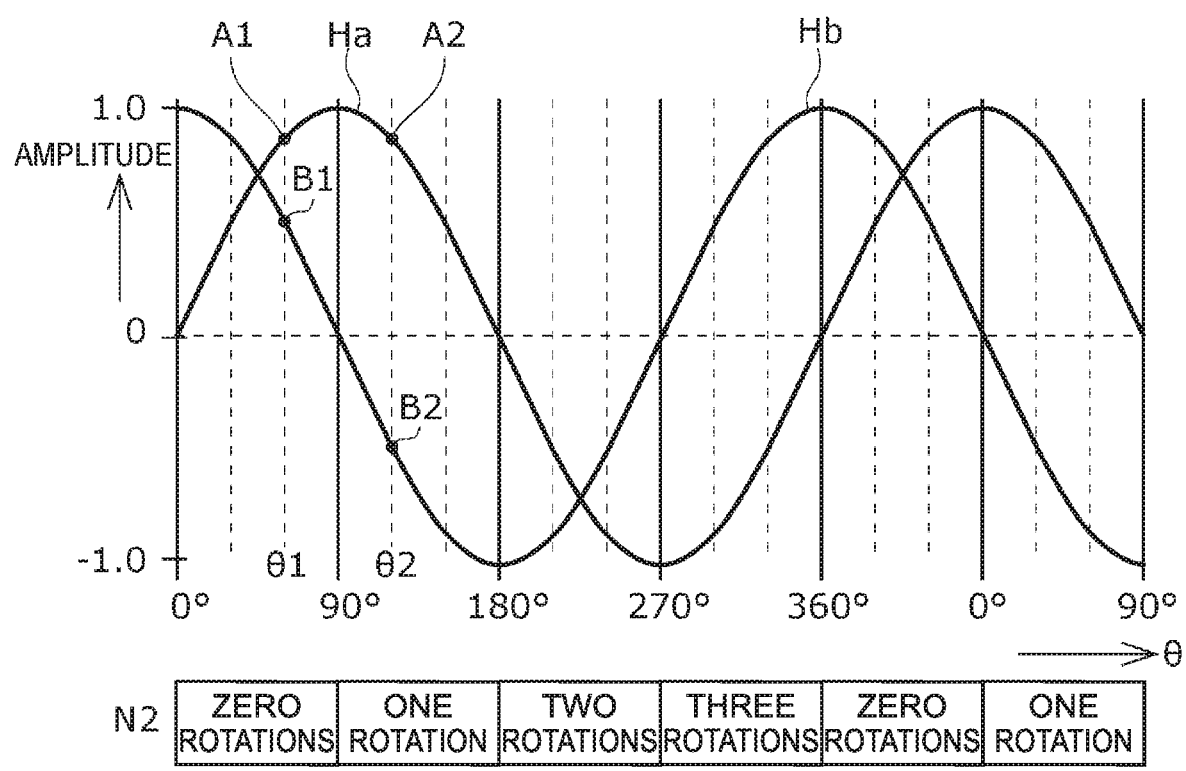
FIG. 6 is a graph for explaining an operation of a correspondence table of the encoder of FIG. 1.

FIG. 6 is a graph for explaining an example of an operation of the correspondence table 44. The correspondence table 44 stores, in a table format, information on amplitudes of two signals Ha, Hb having sinusoidal waveforms with a phase difference of 90°, for example, an angle θ corresponding to the amplitudes of the two signals, and a rotational frequency N2 of the second rotary body 24 corresponding to the angle θ. The correspondence table 44 determines the angle θ in a range from 0° to 360° in correspondence to the amplitudes of the acquired digital detection signals. The correspondence table 44 determines the rotational frequency N2 of the second rotary body 24 in the range from zero to three rotations in correspondence to the determined angle θ. As shown in FIG. 6, N2 is determined as zero rotations when the angle θ is in a range greater than or equal to 0° and less than 90°, N2 is determined as one rotation when the angle θ is in a range greater than or equal to 90° and less than 180°, N2 is determined as two rotations when the angle θ is in a range greater than or equal to 180° and less than 270°, and N2 is determined as three rotations when the angle θ is in a range greater than or equal to 270° and less than 360°.

For example, it is assumed that the angle θ is not known, the amplitude of the signal Ha is 0.87, and the amplitude of the signal Hb is −0.5. There are two points of 60° (A1) and 120° (A2) as the angle θ when the amplitude of the signal Ha is 0.87. Of two points, the angle θ is determined only as 120° (B2) when the amplitude of the signal Hb is −0.5, and the angle θ=60° (B1) when the amplitude of the signal Hb is 0.5 is denied. Since the determined angle θ=120° belongs to the range greater than or equal to 90° and less than 180°, the rotational frequency N2 of the second rotary body 24 is determined as one rotation. Thus, an angle can be determined based on the information on the amplitude by using the information on the angles and amplitudes of signals having sinusoidal waveforms with a plurality of phases in a table format. The rotational frequency N2 of the second rotary body 24 can be determined based on the determined angle.

The rotational frequency determining unit 45 determines the rotational frequency of the first rotary body 20 using the above-described equation 2 based on the rotational angle of the second rotary body 24 acquired by the second rotational angle acquiring unit 42 and the rotational frequency N2 of the second rotary body 24 determined with reference to the correspondence table 44. The output unit 46 determines and outputs the rotation amount of the main shaft 1a using the above-described equation 4 based on the rotational angle of the first rotary body 20 acquired by the first rotational angle acquiring unit 41 and the rotational frequency of the first rotary body 20 determined by the rotational frequency determining unit 45.

(Magnet)

The magnets M1 to M3 each (hereinafter may be referred to as each magnet) have a substantially cylindrical shape. Each magnet is made of a ferrite-based magnet material or an NdFeB-based magnet material, for example. Each magnet may be a rubber magnet or a bond magnet comprising a resin binder, for example. A facing surface of each magnet facing the corresponding angular sensor is provided with a plurality of (for example, two poles) magnetic poles. A magnetization direction of each magnet may be a direction perpendicular to the facing surface of each magnet, or may be a direction parallel to the facing surface. The magnetization direction may be a direction parallel to the facing surface inside each magnet, and a direction perpendicular to the facing surface in the vicinity of the facing surface. In the embodiment, the two magnetic poles are provided on an end portion of each magnet facing the corresponding angular sensor.

Each magnet is housed in a recessed part formed in a magnet holder that is provided at an end portion of a corresponding rotor toward the corresponding angular sensor, and may be fixed by means of adhesion, caulking, or other means, for example. The magnetic poles are formed on each magnet by magnetization. The magnetic flux density distribution in a rotating direction of each magnet may have a trapezoidal waveform, a sinusoidal waveform, or a rectangular waveform. In the embodiment, each magnet is magnetized in a trapezoidal waveform. By adjusting distances from each magnet to the angular sensors AS1, AS2 and the plurality of rotary sensors 38 (hereinafter referred to as each sensing element), the magnetic flux density distribution received by each sensing element can be changed. In the embodiment, a position of each magnet is set so that the magnetic flux density distribution received by each sensing element has a sinusoidal waveform. When the magnet M3 is continuously rotated, for example, the plurality of rotary sensors 38 output detection signals whose waveforms have changed to the sinusoidal waveforms.

(Angular Sensor)

The angular sensors AS1, AS2 each (hereinafter may be referred to each angular sensor) are sensors for detecting an absolute rotational angle in a range from 0° to 360° corresponding to one rotation of each rotor. Each angular sensor outputs, to the control unit 40, a signal (for example, a digital signal) in accordance with the detected rotational angle. Even when each angular sensor is de-energized once and then reenergized, each angular sensor outputs the same rotational angle as that before being de-energized. Therefore, a configuration without a backup power supply is possible. As illustrated in FIG. 4, the angular sensor AS1 is fixed to a sensor supporting part at a position facing the magnetic poles of the magnet M1 through a gap, the magnetic poles of the magnet M1 being provided at an end surface in an axial direction of the first rotary body 20. The angular sensor AS2 is fixed to a sensor supporting part at a position facing the magnetic poles of the magnet M2 through a gap, the magnetic poles of the magnet M2 being provided at an end surface in an axial direction of the second rotary body 24.

A magnetic angular sensor having a relatively high resolution may be used for each angular sensor. The magnetic angular sensor is arranged, in the axial direction of the corresponding rotary body, to face the two magnetic poles of the magnet through a gap. The magnetic angular sensor determines a rotational angle of the rotor based on the rotation of these magnetic poles and outputs a digital signal. By way of example, the magnetic angular sensor includes a sensing element for detecting the magnetic poles and an arithmetic circuit configured to output the digital signal based on the output of this sensing element. The sensing element may include a plurality of (for example, four) magnetic field sensing elements such as hall elements, GMR (Giant Magneto Resistive) elements, or other elements, for example. The arithmetic circuit may be adapted to determine the rotational angle by table processing using a lookup table including differences and ratios between outputs of the plurality of sensing elements as keys. The sensing element and the arithmetic circuit may be integrally arranged on one IC chip. This IC chip may be embedded in a resin having a thin rectangular parallelepiped outer shape. Each angular sensor outputs, to the control unit 40, an angular signal as a digital signal corresponding to the rotational angle of the corresponding rotor detected through a wiring member (not illustrated).

In particular, the angular sensor AS1 detects the magnetic poles of the magnet M1 provided in the first rotary body 20 to output the rotational angle of the first rotary body 20 as a multi-bit digital signal (for example, 7 bits). The angular sensor AS2 detects the magnetic poles of the magnet M2 provided in the second rotary body 24 to output the rotational angle of the second rotary body 24 as a multi-bit digital signal (for example, 7 bits).

Figure 7:
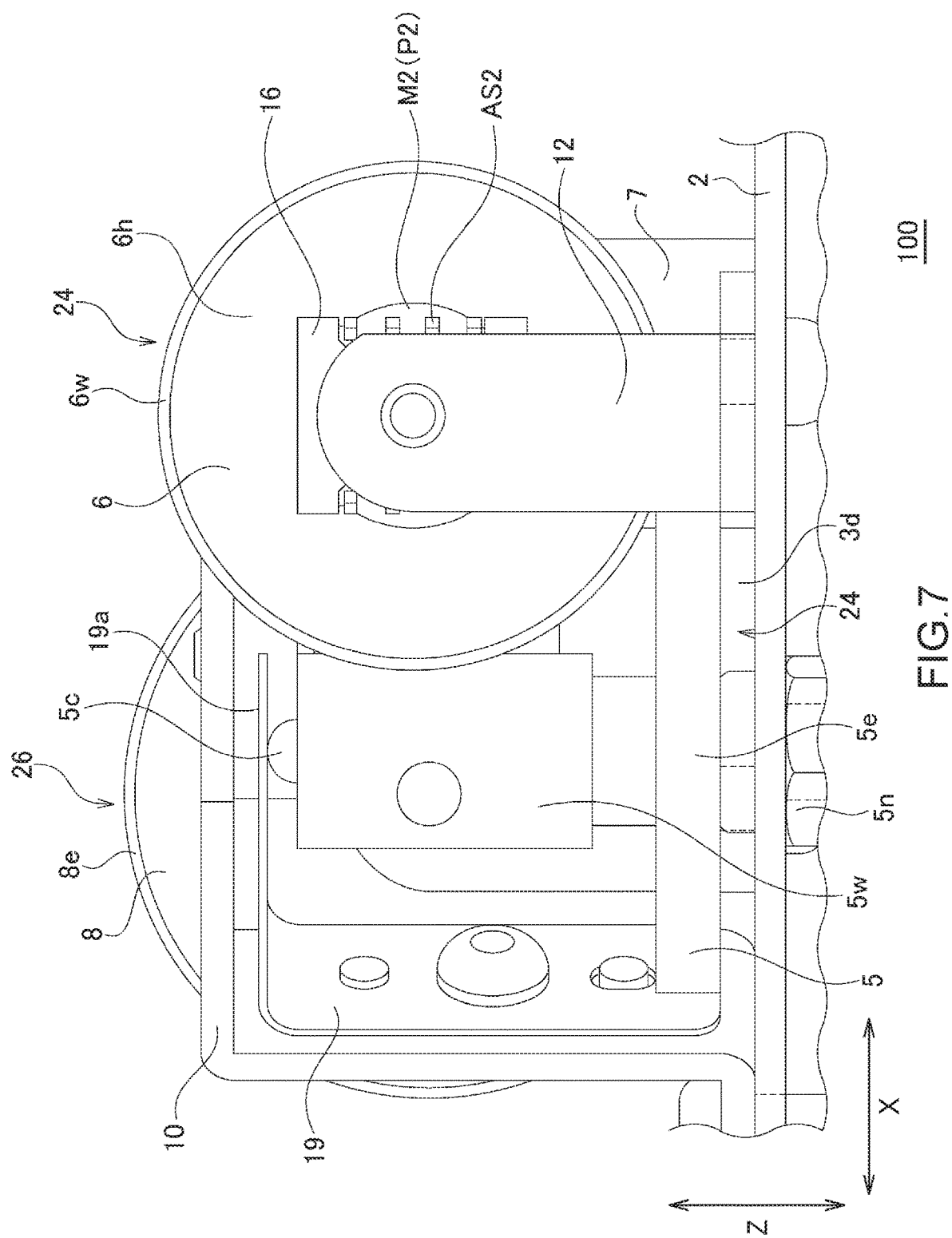
FIG. 7 is an enlarged front view illustrating a part of the encoder of FIG. 1.
Figure 8:
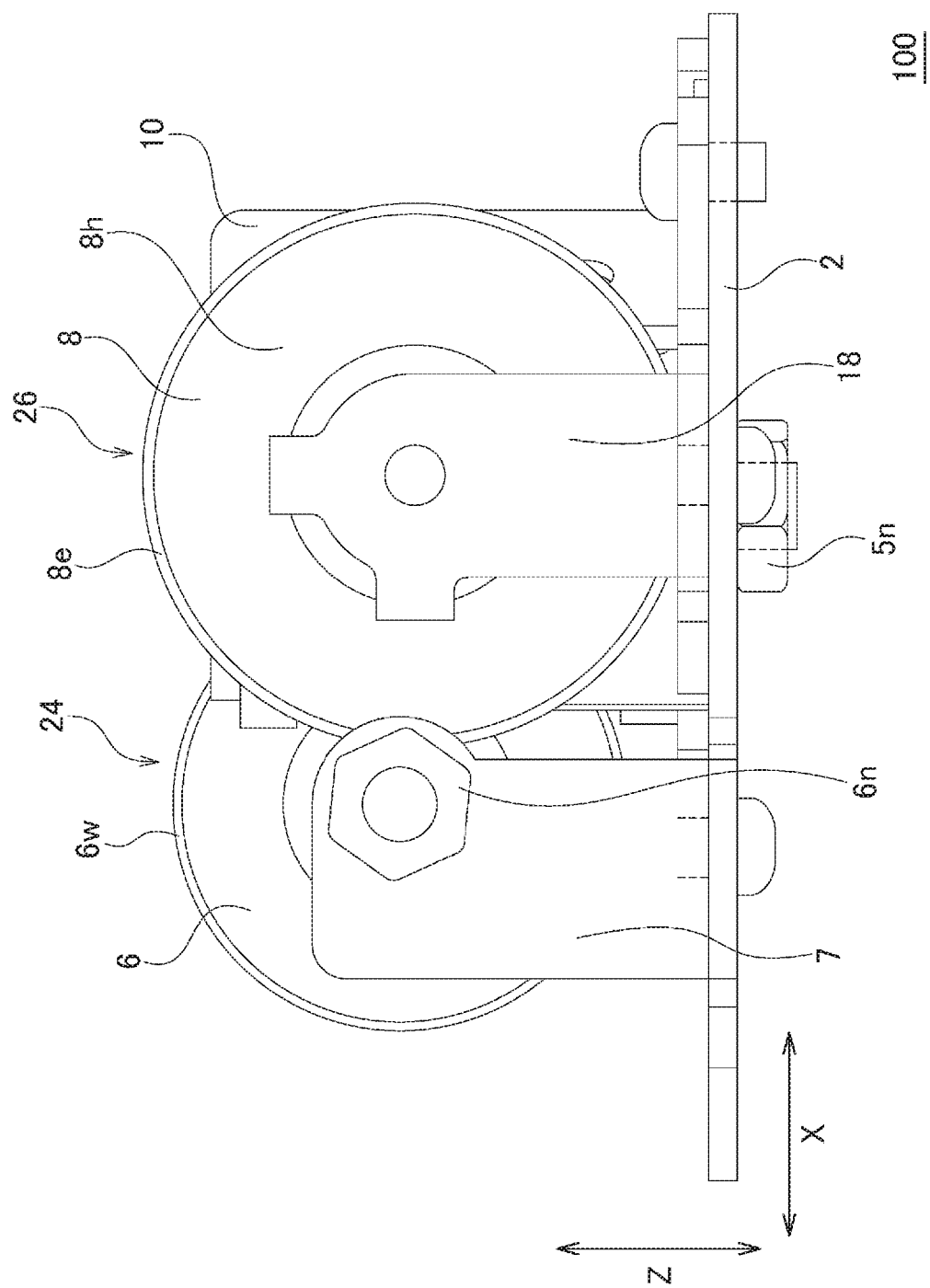
FIG. 8 is an enlarged rear view illustrating a part of the encoder of FIG. 1.
Figure 9:
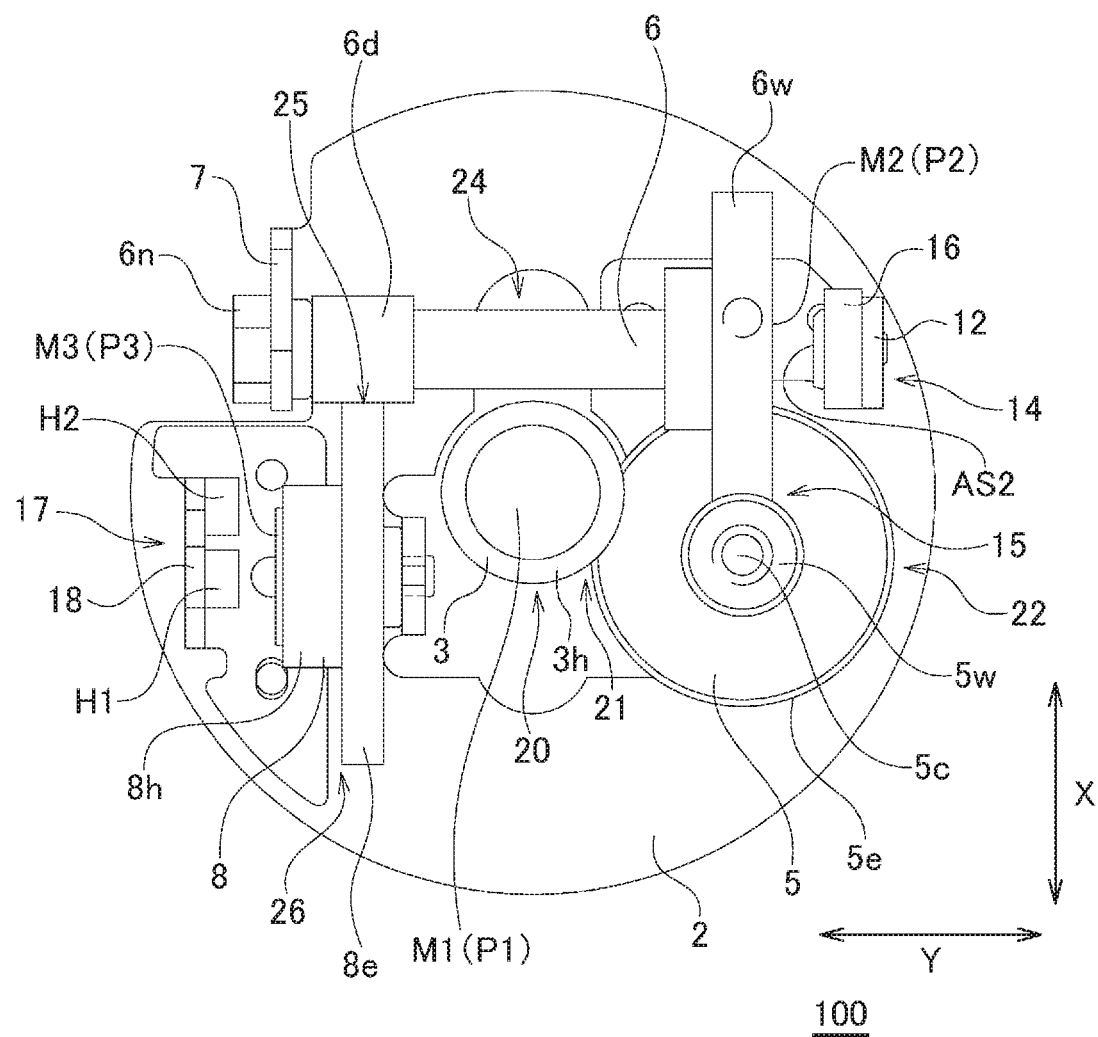
FIG. 9 is an enlarged plan view illustrating a part of the encoder of FIG. 1.
Figure 10:
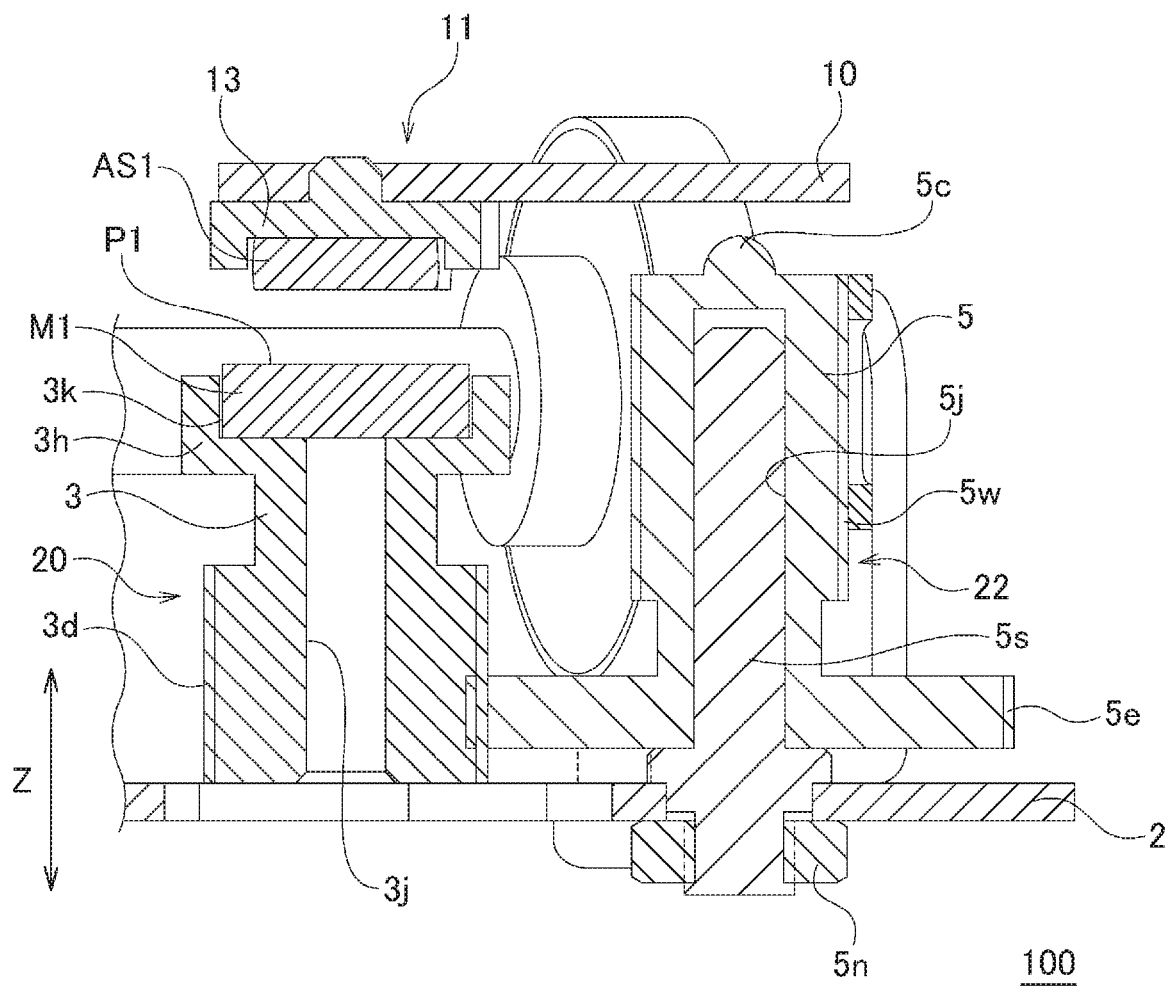
FIG. 10 is a cross-sectional view illustrating a periphery of a first rotary body and an intermediate rotary body.
Figure 11:
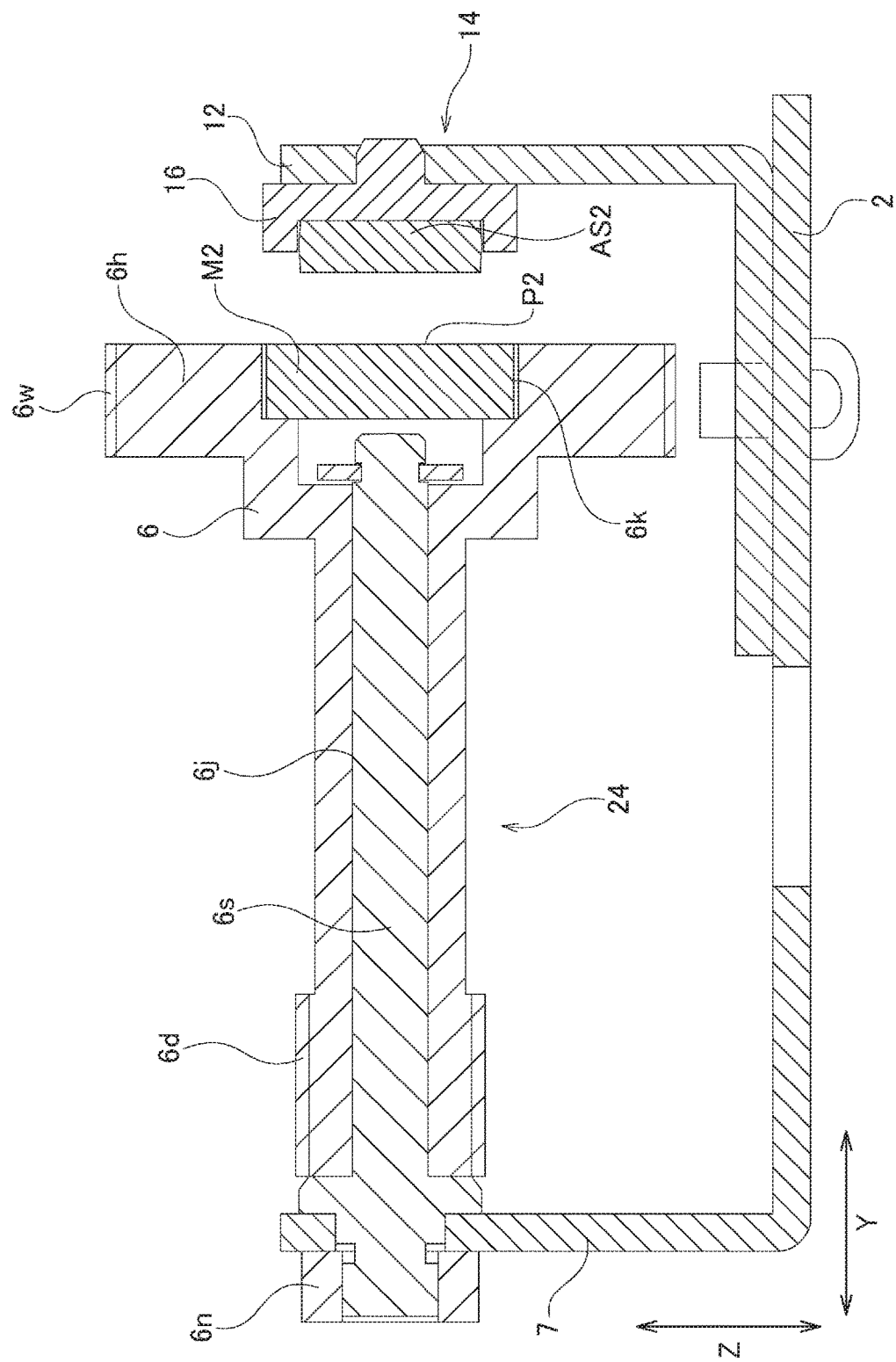
FIG. 11 is a cross-sectional view illustrating a periphery of a second rotary body.
Figure 12:
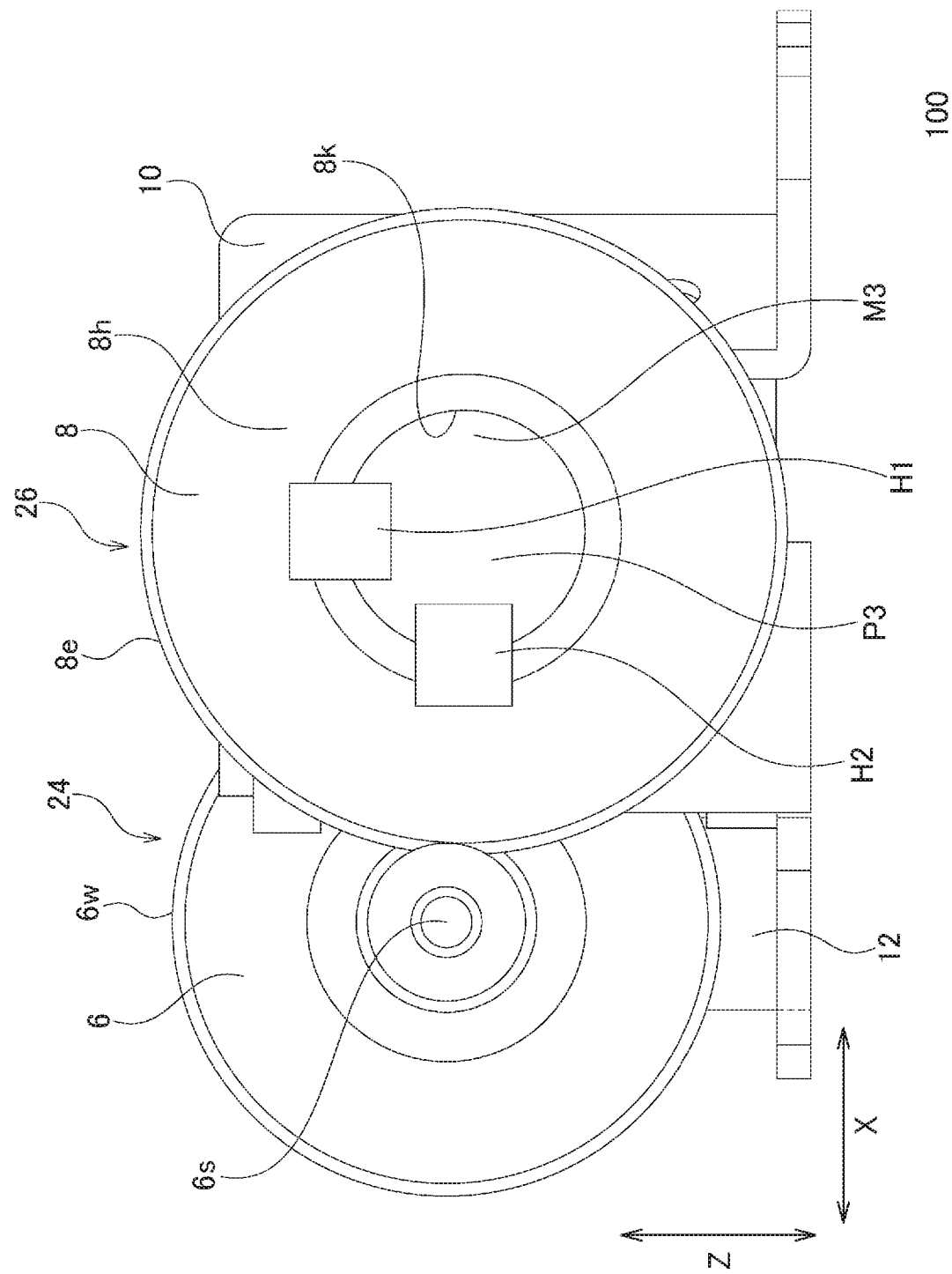
FIG. 12 is a front view illustrating a periphery of hall elements.
Figure 13:
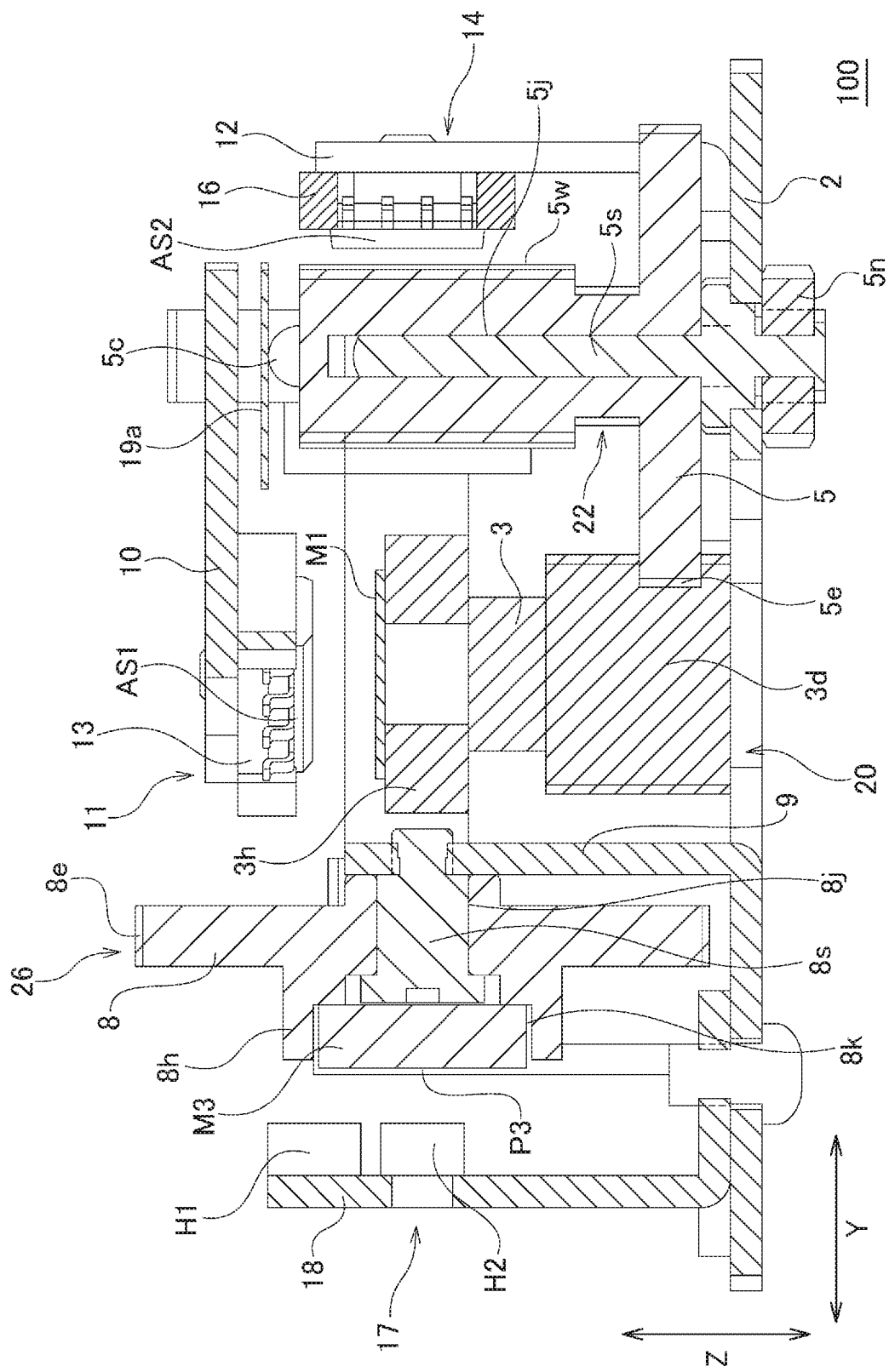
FIG. 13 is a cross-sectional view illustrating a periphery of the first rotary body, the intermediate rotary body, and a third rotary body.

Subsequently, the first rotary body 20, the intermediate rotary body 22, the second rotary body 24, and the third rotary body 26 (hereinafter referred to as each rotary body) of the encoder 100 and their peripheries will be described with reference to FIGS. 7 to 13. FIG. 7 is a front view of the encoder 100. FIG. 8 is a rear view of the encoder 100. FIG. 9 is a plan view of the encoder 100. In FIG. 9, members such as a bracket 10 (described later) and the angular sensor AS1 are not illustrated. FIG. 10 is a partial cross-sectional view illustrating a periphery of the first rotary body 20 and the intermediate rotary body 22. FIG. 11 is a partial cross-sectional view illustrating a periphery of the second rotary body 24. FIG. 12 is a front view illustrating a periphery of the hall elements H1, H2. FIG. 12 illustrates a state in which members such as brackets 18 and 7 (described later) are omitted from FIG. 7. FIG. 13 is a partial cross-sectional view illustrating a periphery of the first rotary body 20, the intermediate rotary body 22, and the third rotary body 26. Each rotary body and the peripheral members are supported by a disk-like base 2 fixed on an upper side of the motor 1.

The first rotary body 20 includes a circular member 3 and the magnet M1. The circular member 3 extends in the Z-axis direction, and includes a magnet holder 3h and a drive gear 3d in this order from the angular sensor AS1 side (see FIG. 10, in particular). A recessed part 3k is formed on an end surface of the magnet holder 3h facing the angular sensor AS1. This recessed part 3k is recessed in a circular shape in a rotational axis direction of the first rotary body 20. The recessed part 3k of the magnet holder 3h houses and fixes the magnet M1 therein. The drive gear 3d is a spur gear having 24 gear teeth at respective 24 equally spaced positions around an outer periphery of the drive gear 3d. A hole 3j is formed in an end portion of the circular member 3 on the motor 1 side, so that the main shaft 1a is inserted into and fixed to the hole 3j.

The intermediate rotary body 22 is an element for reducing the rotational speed between the first rotary body 20 and the second rotary body 24 and transmitting the rotation to the second rotary body 24. Providing the intermediate rotary body 22 enables the speed reduction ratio R12 between the first rotary body 20 and the second rotary body 24 to be increased. The rotational axis of the intermediate rotary body 22 is provided to extend in the Z-axis direction parallel to the rotational axis of the first rotary body 20. The intermediate rotary body 22 includes a driven gear 5e and a worm gear part 5w formed on an outer peripheral surface of the intermediate rotary body 22 (see FIG. 10, in particular). A circular member 5 extends in the Z-axis direction. The circular member 5 has a hole 5j for housing a shaft 5s therein, the shaft 5s being fixed to the base 2 by a nut 5n, and is rotatably supported by the shaft 5s. The driven gear 5e engages with the drive gear 3d and is driven by the drive gear 3d. The driven gear 5e and the drive gear 3d form the first speed reducing mechanism 21 (see FIG. 9, in particular). The driven gear 5e is a spur gear having 48 gear teeth at respective 48 equally spaced positions around an outer periphery of the driven gear 5e. The worm gear part 5w is a cylindrical worm extending upward from the driven gear 5e. For example, one screw-shaped groove is provided on the outer peripheral surface of the worm gear part 5w. Note that a plurality of screw-shaped grooves may be provided.

When the worm gear part 5w is rotated, an upward force may act on the circular member 5 due to the action of the worm. In the embodiment, a worm holding part 19a is provided to hold a hemispherical projection 5c provided on an upper end of the circular member 5 (see FIG. 7, in particular). The worm holding part 19a contacts the hemispherical projection 5c to press it in a downward direction, thereby preventing the circular member 5 from moving. The worm holding part 19a is provided on one end side of an angled leaf spring 19, and the other end of the leaf spring 19 is fixed to the bracket 10. The leaf spring 19 is fixed to the bracket 10 by a rivet or a screw, for example. The bracket 10 will be described later. By way of example, the leaf spring 19 may be formed of a stainless steel plate having a thickness of about 0.1 mm to 0.2 mm.

The second rotary body 24 includes a circular member 6 and the magnet M2. The circular member 6 extends in the Y-axis direction (see FIG. 11, in particular). The circular member 6 includes a magnet holder 6h, a worm wheel part 6w and a drive gear 6d formed in this order from the angular sensor AS2 side. A recessed part 6k is formed on an end surface of the magnet holder 6h facing the angular sensor AS2. This recessed part 6k is recessed in a circular shape in a rotational axis direction of the second rotary body 24. The recessed part 6k of the magnet holder 6h houses and fixes the magnet M2 therein. The circular member 6 has a hole 6j for housing a shaft 6s therein and is rotatably supported by the shaft 6s. The shaft 6s is fixed to a portion of the bracket 7 extending upward from the base 2 by a nut 6n. The bracket 7 is formed by cutting and bending upward a part of the base 2. The bracket 7 may be formed as a separate body from the base 2. The bracket 7 may be an angled member, one end of which is fixed to the base 2, for example. The shaft 6s extends in the Y-axis direction parallel to the base 2.

The worm wheel part 6w engages with the worm gear part 5w of the intermediate rotary body 22 and is driven by the worm gear part 5w. The worm wheel part 6w has 50 gear teeth at respective 50 equally spaced positions around an outer periphery of the worm wheel part 6w. The gear teeth of the worm wheel part 6w may be helical gears. The worm gear part 5w and the worm wheel part 6w form the worm mechanism 15 (see FIG. 9, in particular). The drive gear 6d is a spur gear having 15 gear teeth at respective 15 equally spaced positions around an outer periphery of the drive gear 6d. The rotational axis of the second rotary body 24 is provided to be inclined by 90° with respect to the rotational axes of the first rotary body 20 and the intermediate rotary body 22.

The third rotary body 26 includes a circular member 8 and the magnet M3 (see FIG. 13, in particular). The circular member 8 extends in the Y-axis direction. The circular member 8 includes a magnet holder 8h and a driven gear 8e formed in this order from the hall elements H1, H2 side. A recessed part 8k is formed on an end surface of the magnet holder 8h facing the hall elements H1, H2. This recessed part 8k is recessed in a circular shape in a rotational axis direction of the third rotary body 26. The recessed part 8k of the magnet holder 8h houses and fixes the magnet M3 therein. The circular member 8 has a hole 8j for housing a shaft 8s therein and is rotatably supported by the shaft 8s. The shaft 8s is fixed to a portion of the bracket 9 extending upward from the base 2 by means of caulking or other means. The bracket 9 is formed by cutting and bending upward a part of the base 2. The bracket 9 may be formed as a separate body from the base 2. The bracket 9 may be an angled member, one end of which is fixed to the base 2, for example. The shaft 8s extends in the Y-axis direction parallel to the base 2. The driven gear 8e is a spur gear having 60 gear teeth at respective 60 equally spaced positions around an outer periphery of the driven gear 8e. The driven gear 8e engages with the drive gear 6d and is driven by the drive gear 6d. The driven gear 8e and the drive gear 6d form the second speed reducing mechanism 25 (see FIG. 9, in particular). The third rotary body 26 is provided so that the rotational axis of the third rotary body 26 is parallel to the rotational axis of the second rotary body 24.

Subsequently, a first sensor supporting part 11, a second sensor supporting part 14, and a hall element supporting part 17 will be described (see FIG. 4, FIG. 5, FIG. 7, and FIG. 13, in particular). The first sensor supporting part 11 includes the bracket 10 and a sensor holder 13. The second sensor supporting part 14 includes a bracket 12 and a sensor holder 16. The hall element supporting part 17 includes the bracket 18. The brackets 10, 12, 18 each are an angled member, one end side of each of the brackets 10, 12, 18 being fixed to the base by a rivet or a screw, for example. The sensor holders 13, 16 include projection parts fitted to supporting holes formed on another end sides of the brackets 10, 12 and housing parts for housing the angular sensors AS1, AS2, respectively.

The hall elements H1, H2 are supported to another end side of the bracket 18. The hall elements H1, H2 are arranged so that the centers of the respective hall elements H1, H2 are positioned in the vicinity of a contour line of the magnet M3 (see FIG. 5, FIG. 8 and FIG. 12, in particular). By way of example, the hall element H1 is arranged at a 12 o'clock position and the hall element H2 is arranged at a 9 o'clock position.

Each of the circular members 3, 5, 6 and 8 may be formed of a resin material such as polyacetal, by molding, for example. Each of the shafts 5s, 6s and 8s may be formed by cutting and grinding or rolling and forging a rod material made of stainless steel, for example. Each of the base 2 and the brackets 7, 9, 10, 12, 18 may be formed by pressing the stainless steel plate having a thickness of about 1 mm, for example. A wet lubrication system in which grease or the like is applied may be used for lubrication for each gear portion, but in the embodiment, a dry lubrication system is used.

Subsequently, features of the encoder 100 will be described.

It is desirable for the encoder to have higher resolution with an inexpensive configuration. The encoder 100 in the embodiment includes the magnet M3 rotating integrally with a rotary body, and a plurality of rotary sensors 38 detecting magnetic poles P3 of the magnet M3 to output detection signals having sinusoidal waveforms, each sinusoidal waveform having a different phase. According to this configuration, the encoder 100 determines the rotation amount of the main shaft 1a using detection signals having sinusoidal waveforms, each sinusoidal waveform having a different phase, the detection signals being output from the plurality of rotary sensors 38, and is thereby capable of increasing the resolution with an inexpensive configuration.

It is desirable to reduce the number of angular sensors from the viewpoint of downsizing. In the encoder 100 of the embodiment, the rotary bodies include the first rotary body 20 rotating integrally with the main shaft 1a and the third rotary body 26 rotating together with the rotation of the first rotary body 20, the angular sensor AS1 is provided to detect a rotational angle of the first rotary body 20, and the magnet M3 is arranged in the third rotary body 26. According to this configuration, the rotation amount of the main shaft 1a can be determined using the rotational angle of the first rotary body 20 detected by the angular sensor AS1 and the detection signals of the rotary sensors 38, thereby enabling a desired resolution to be easily obtained even when the number of angular sensors is reduced.

It is desired that the encoder is small. In the encoder 100 of the embodiment, the rotary bodies include the second rotary body 24 arranged between the first rotary body 20 and the third rotary body 26, the angular sensor AS2 is provided to detect the rotational angle of the second rotary body 24, the second rotary body 24 reduces the rotational speed at the speed reduction ratio R12 with respect to the first rotary body 20, and the third rotary body 26 reduces the rotational speed at the speed reduction ratio R23 with respect to the second rotary body 24. According to this configuration, the number of rotary bodies and the number of angular sensors can be reduced and therefore, this is advantageous to the downsizing of the encoder 100. The encoder 100 can be configured so that the projection range in which the encoder 100 is projected in the Z-axis direction falls within the range in which the motor 1 is projected in the Z-axis direction. By way of example, the projection range in which the encoder 100 is projected in the Z-axis direction may fall within a square region with a side of 42 mm or a circular region with a diameter of 42 mm.

In the encoder in which the rotation amount is obtained by a high level of calculation using a number of angular sensors, the speed of the computation cannot follow the high-speed rotation, which may cause malfunction. In the encoder 100 of the embodiment, the rotational angle of the first rotary body 20 is determined according to the detection result of the angular sensor AS1, the rotational frequency of the first rotary body 20 is determined according to the detection result of the angular sensor AS2 and the detection signals from the plurality of rotary sensors 38, and the rotation amount of the first rotary body 20 is determined according to the determined rotational angle of the first rotary body 20 and the determined rotational frequency of the first rotary body 20. According to this configuration, an amount of processing for determining the rotation amount is low and therefore, the malfunction can be reduced during high-speed rotation. Since the amount of processing is low, a CPU with a relatively low speed can be employed in the control device and an increase in power consumption can be suppressed. The number of expensive angular sensors can be reduced and therefore, this is advantageous to cost reduction.

It is assumed that an error in the detected rotational angle is increased due to backlash with gears of a transmission mechanism when the rotation direction is reversed. In the encoder 100 of the embodiment, a mechanism for transmitting the rotation of the first rotary body 20 to the second rotary body 24 includes the worm mechanism 15 having the worm gear part 5w and the worm wheel part 6w. According to this configuration, the backlash is suppressed to thereby reduce the error in the rotational angle. In particular, the error can be prevented from occurring even when the speed reduction ratio R12 between the first rotary body 20 and the second rotary body 24 is set to be high.

In the configuration in which the worm gear is provided on the first rotary body 20, it is desirable to hold the end portion of the first rotary body 20, but this makes it difficult to arrange the angular sensor AS1 in the vicinity of the end portion of the first rotary body 20. In the encoder 100 of the embodiment, the mechanism for transmitting the rotation of the first rotary body 20 to the second rotary body 24 includes the intermediate rotary body 22, the intermediate rotary body 22 reduces the rotational speed at the speed reduction ratio R1 (for example, 1/2) with respect to the first rotary body 20, and the second rotary body 24 reduces the rotational speed at the speed reduction ratio R2 (for example, 1/50) with respect to the intermediate rotary body 22. According to this configuration, the worm gear part 5w is formed on the intermediate rotary body 22, so that the worm holding part 19a can contact the end portion of the intermediate rotary body 22, which makes it easy to arrange the angular sensor AS1 in the vicinity of the end portion of the first rotary body 20.

When the worm mechanism is rotated at a high speed, the durability may be deteriorated. In the encoder 100 of the embodiment, the worm gear part 5w is provided on the intermediate rotary body 22. According to this configuration, the worm gear part 5w is formed on the intermediate rotary body 22, which rotates more slowly than the first rotary body 20, thereby enabling reduction of the rotational speed of the worm mechanism 15 to improve the durability.

When the worm gear part 5w is rotated, a force in the rotational axis direction acts on the intermediate rotary body 22, whereby the intermediate rotary body 22 may be moved in the rotational axis direction. The encoder 100 of the embodiment includes the worm holding part 19a that is an urging member to urge to hold the intermediate rotary body 22 in the rotational axis direction of the intermediate rotary body 22. According to this configuration, the movement of the intermediate rotary body 22 can be prevented.

It is desired that the encoder is small. In the encoder 100 of the embodiment, the rotational axis of the second rotary body 24 is provided in parallel to the rotational axis of the third rotary body 26, and the first rotary body 20 is provided to be arranged between the rotational axis of the second rotary body 24 and the rotational axis of the third rotary body 26. According to this configuration, the second rotary body 24 and the third rotary body 26 can be arranged to surround the first rotary body 20, thereby enabling the encoder to be made more compact than it otherwise would be.

When a plurality of magnetic fields interfere with one another, the detection accuracy of the sensor may be reduced. When the magnetic field of the magnet M3 interferes with the magnetic field of the magnet M2, for example, the detection accuracy of the angular sensor AS2 may be reduced. In the encoder 100 of the embodiment, the second rotary body 24 includes another magnet M2 rotating integrally with the second rotary body 24. When a space is divided into two regions by a plane perpendicular to the rotational axis of the second rotary body 24 and including the rotational axis of the first rotary body 20, this another magnet M2 is arranged in the region of the two regions, in the region the magnet M3 being not arranged. According to this configuration, the magnet M3 is arranged in one region while the magnet M2 is arranged in the other region, which enables these magnets to be separated from each other, whereby the detection accuracy of the angular sensor AS2 can be prevented from being reduced.

These magnets are arranged so that the respective magnetic fields are oriented in the directions different from each other. Thereby, the detection accuracy of the angular sensors can be prevented from being reduced. In the encoder 100 of the embodiment, the magnets M1, M2, M3 are arranged so that the respective magnetic fields are oriented in the directions different from one another, but only magnets proximate to each other that may interfere with each other may be arranged so that the respective magnetic fields are oriented in the directions different from one another.

When the encoder has a complicated configuration, the reliability may be lowered. The encoder 100 of the embodiment includes a first acquisition mechanism (including the magnet M1, the angular sensor AS1 and the first rotational angle acquiring unit 41) acquiring the rotational angle of the first rotary body 20 rotating integrally with the main shaft 1a, a second acquisition mechanism (including the magnet M2, the angular sensor AS2 and the second rotational angle acquiring unit 42) acquiring the rotational angle of the second rotary body 24, the second rotary body 24 reducing a rotational speed at the speed reduction ratio R12 (for example, 1/100) with respect to the first rotary body 20, a third acquisition mechanism (including the hall elements H1, H2 and the hall signal acquiring unit 43) detecting the magnetic poles P3 of the magnet M3, the magnet M3 reducing the rotational speed at a speed reduction ratio R23 (for example, 1/4) with respect to the second rotary body 24, and acquiring two detection signals having sinusoidal waveforms, each sinusoidal waveform having a different phase, a first determination element (including the correspondence table 44 and the rotational frequency determining unit 45) determining the rotational frequency of the first rotary body 20 according to the acquired rotational angle of the second rotary body 24 and the acquired detection signals, and a second determination element (including the output unit 46) determining the rotation amount of the main shaft 1a according to the acquired rotational angle of the first rotary body 20 and the determined rotational frequency of the first rotary body 20. According to this configuration, the number of elements acquiring the rotational angle of the rotary body is small, whereby the configuration of the encoder is simplified and the reliability can be prevented from being lowered.

In a method for determining a rotation amount by a high level of calculation, the CPU processing can be performed at a high speed, which may cause an increase in power consumption. A method for determining a rotation amount, the method being applied to the encoder 100 of the embodiment, includes acquiring the rotational angle of the first rotary body 20 rotating integrally with the main shaft 1a, acquiring the rotational angle of the second rotary body 24, the second rotary body 24 reducing the rotational speed at the speed reduction ratio R12 with respect to the first rotary body 20, detecting the magnetic poles P3 of the magnet M3, the magnet M3 reducing the rotational speed at the speed reduction ratio R23 with respect to the second rotary body 24, and acquiring a plurality of detection signals having sinusoidal waveforms, each sinusoidal waveform having a different phase, determining the rotational frequency of the first rotary body 20 according to the acquired rotational angle of the second rotary body and the acquired detection signals, and determining the rotation amount of the main shaft 1a according to the acquired rotational angle of the first rotary body 20 and the determined rotational frequency of the first rotary body 20. Since the amount of processing for determining the rotation amount is low, a CPU with a low speed can be employed in the control device and an increase in power consumption can be suppressed.

The present disclosure has been described based on the embodiments. These embodiments are illustrative, and it is understood by those skilled in the art that various modification and variations may be made within the scope of the claims of the present disclosure, and that such modifications and variations are also within the scope of the claims of the present disclosure. The description in the present specification and drawings should be considered as illustrative and not respective.

Hereinafter, variants will be described. In the drawings and explanations of the variants, the same or similar components and members as those of the embodiments are denoted by the same reference numerals. The explanations duplicating with those of the embodiments are appropriately omitted, and only different configurations from those of the embodiments are described specifically.

(First Variant)

In the embodiments, an example has been described in which the plurality of rotary sensors 38 are provided with two hall elements, but the number of hall elements is not limited to two. For example, the plurality of rotary sensors 38 may be provided with three or more hall elements.

In the embodiments, an example has been described in which the intermediate rotary body 22 is provided and the worm gear part 5w is formed on the intermediate rotary body 22, but the present disclosure is not limited thereto. For example, the intermediate rotary body 22 may be removed and the worm gear part may be formed on the first rotary body 20. The configuration of the encoder is further simplified and therefore, this is advantageous to the downsizing of the encoder.

Figure 14:
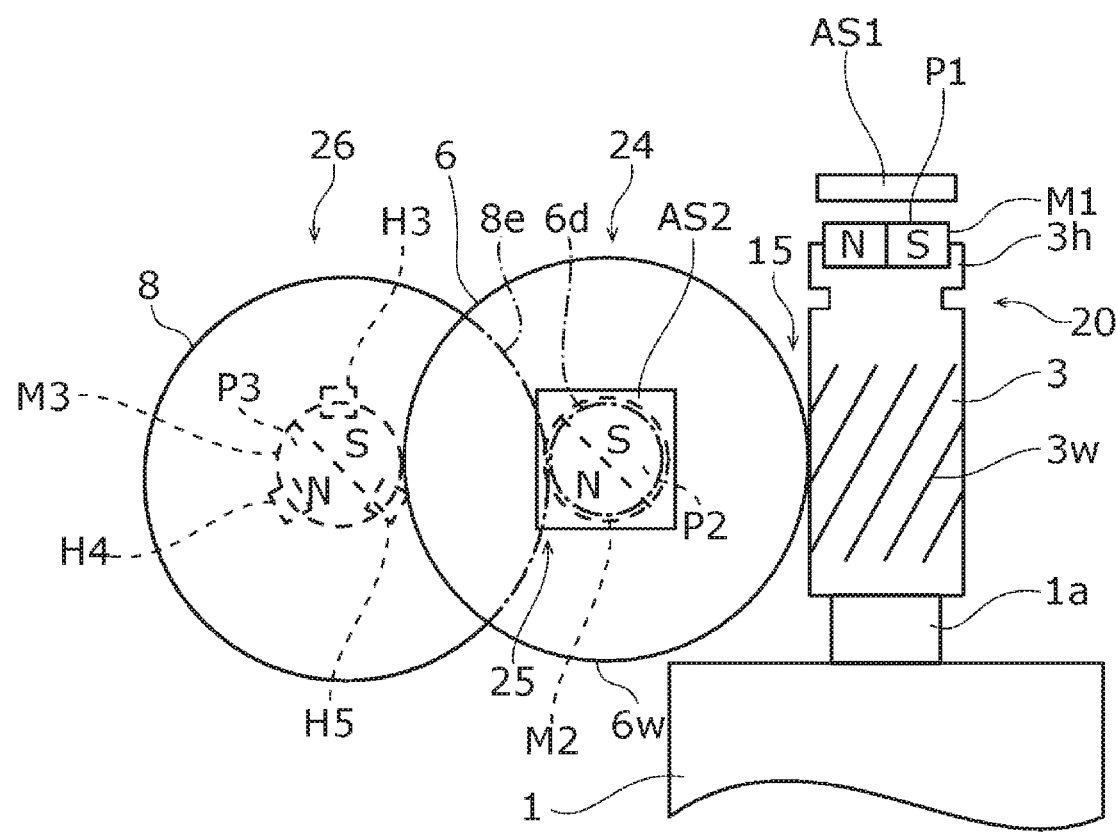
FIG. 14 is an exploded view illustrating an encoder of a first variant.

FIG. 14 is an exploded view illustrating an encoder 200 according to a first variant and corresponds to FIG. 3. The encoder 200 is different from the encoder 100 of the embodiments in portions described later, and the other configurations are similar to the embodiments. In the encoder 200, the intermediate rotary body is removed and the worm gear part 3w is formed on the first rotary body 20. The worm gear part 3w and the worm wheel part 6w form the worm mechanism 15. The encoder 200 is provided with three hall elements H3, H4, H5 instead of the hall elements H1, H2. The hall elements H3, H4, H5 are arranged at positions apart from one another by an electric angle of $2\pi/3$. The hall elements H3, H4, H5 output three detection signals, respectively, the three detection signals having sinusoidal waveforms with a phase difference of 120° with one another. The hall signal acquiring unit 43 converts the detection signals of analog signals acquired from the hall elements H3, H4, H5 to digital detection signals. The speed reduction ratio R23 of the third rotary body 26 with respect to the second rotary body 24 is set to 1/6. In the encoder 200 thus formed, the third rotary body 26 rotates once for every six rotations of the second rotary body 24 and therefore, the third rotary body 26 rotates once for every 600 rotations of the first rotary body 20.

Figure 15:
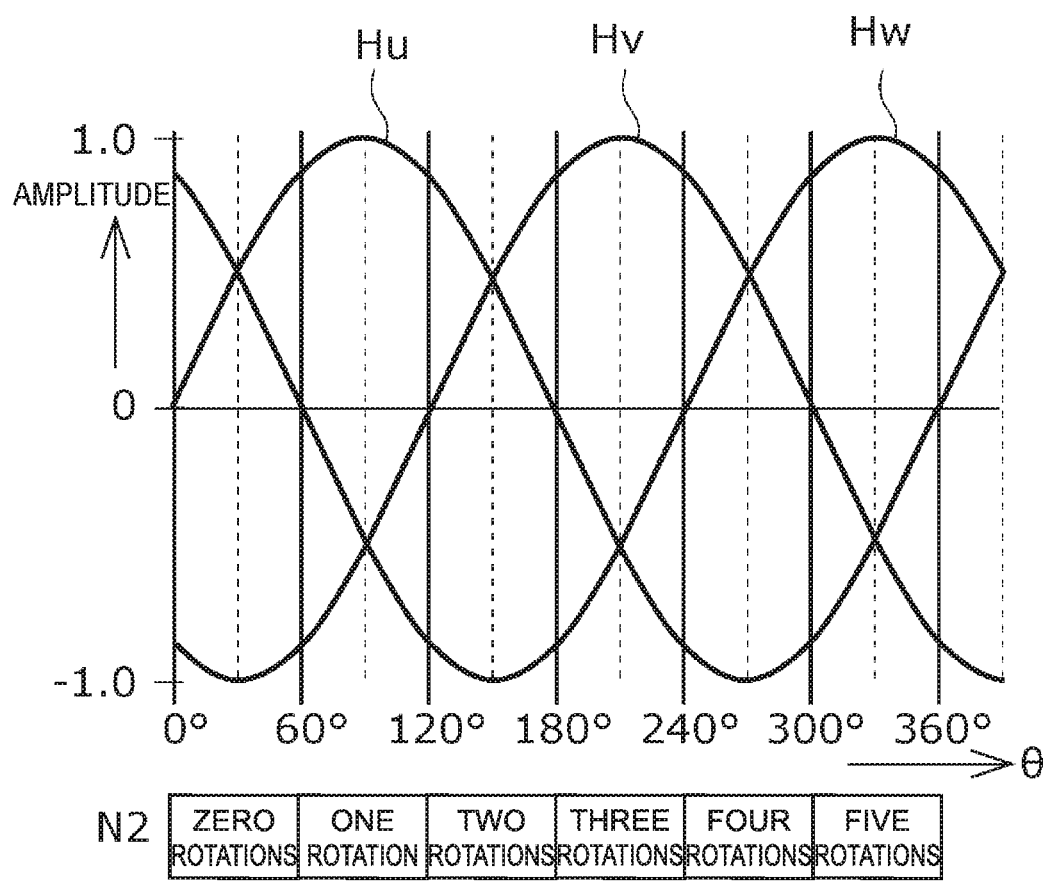
FIG. 15 is a graph for explaining an operation of a correspondence table of the encoder of the first variant.

FIG. 15 is a graph for explaining an example of an operation of the correspondence table 44 in the encoder 200. FIG. 15 corresponds to FIG. 6. The correspondence table 44 stores, in a table format, amplitudes of three signals having sinusoidal waveforms with a phase difference of 120° with one another, an angle θ corresponding to the amplitudes of the three signals, and a rotational frequency N2 of the second rotary body 24 corresponding to the angle θ. The correspondence table 44 determines the information of the angle θ in a range from 0° to 360° in correspondence to the amplitudes of the digital detection signals acquired by the hall signal acquiring unit 43. The correspondence table 44 determines the rotational frequency N2 of the second rotary body 24 in the range from zero to five rotations in correspondence to the determined angle θ. As shown in FIG. 15, the N2 is determined as zero rotations when the angle θ is in a range greater than or equal to 0° and less than 60°, the N2 is determined as one rotation when the angle θ is in a range greater than or equal to 60° and less than 120°, the N2 is determined as two rotations when the angle θ is in a range greater than or equal to 120° and less than 180°, the N2 is determined as three rotations when the angle θ is in a range greater than or equal to 180° and less than 240°, the N2 is determined as four rotations when the angle θ is in a range greater than or equal to 240° and less than 300°, and the N2 is determined as five rotations when the angle θ is in a range greater than or equal to 300° and less than 360°. By thus determining the rotational frequency by dividing one rotation of the third rotary body 26 into six, the rotational frequencies for six rotations of the second rotary body 24 can be individually determined. The encoder 200 thus configured can determine absolute rotational quantities for 600 rotations (±300 rotations) of the first rotary body 20.

(Second Variant)

In the embodiments, an example has been described in which the magnets M1 to M3 each are an integrated member, but the present disclosure is not limited thereto. The magnets M1 to M3 each may be formed by combining a plurality of pieces.

(Third Variant)

In the description of the embodiments, an example has been described in which the plurality of rotary sensors 38 each are a hall element, but the present disclosure is not limited thereto. A plurality of rotary sensors may be used, which detect the magnetic poles of the magnet to output the detection signals having sinusoidal waveforms based on another detection principle.

(Fourth Variant)

In the description of the embodiments, an example has been described in which each of the circular members 3, 5, 6, 8 forming the respective gears is formed of a resin material, but the material is not limited to the resin material. Some of these circular members may be formed of a metal material or another material.

According to the above-described variants, the same operation and effect as in the encoder 100 according to the embodiments can be attained.

Arbitrary combinations of the above-described embodiments and variants are effective as the embodiments of the present disclosure. New embodiments provided by the combinations have the respective advantages of the embodiments and the variants to be combined.

What is claimed is:

1. An absolute encoder for determining a rotation amount of a main shaft over a plurality of rotations, the absolute encoder comprising:
   at least one rotary body rotating together with a rotation of the main shaft;
   a magnet rotating integrally with the rotary body; and
   a plurality of rotary sensors detecting magnetic poles of the magnet to output detection signals having sinusoidal waveforms, each sinusoidal waveform having a different phase, wherein:
   the at least one rotary body includes a first rotary body rotating integrally with the main shaft and a third rotary body rotating together with a rotation of the first rotary body,
   the absolute encoder further comprises a first angular sensor to detect a rotational angle of the first rotary body,
   the magnet is arranged in the third rotary body,
   the at least one rotary body includes a second rotary body arranged between the first rotary body and the third rotary body, the absolute encoder further comprises a second angular sensor to detect a rotational angle of the second rotary body, the second rotary body reduces a rotational speed at a first speed reduction ratio with respect to the first rotary body, the third rotary body reduces a rotational speed at a second speed reduction ratio with respect to the second rotary body, a mechanism for transmitting the rotation of the first rotary body to the second rotary body includes an intermediate rotary body, the intermediate rotary body reducing a rotational speed at a third speed reduction ratio with respect to the first rotary body, and the second rotary body reduces a rotational speed at a fourth speed reduction ratio with respect to the intermediate rotary body.

2. The absolute encoder according to claim 1, wherein the rotational angle of the first rotary body is determined according to a detection result of the first angular sensor, a rotational frequency of the first rotary body is determined according to a detection result of the second angular sensor and the detection signals from the plurality of rotary sensors, and a rotation amount of the first rotary body is determined according to the determined rotational angle of the first rotary body and the determined rotational frequency of the first rotary body.

3. The absolute encoder according to claim 1, wherein the mechanism for transmitting the rotation of the first rotary body to the second rotary body includes a worm mechanism having a worm gear part and a worm wheel part.

4. The absolute encoder according to claim 3, wherein the worm gear part is provided on the intermediate rotary body.

5. The absolute encoder according to claim 4, further comprising an urging member to urge to hold the intermediate rotary body in a rotational axis direction of the intermediate rotary body.

6. The absolute encoder according to claim 1, wherein a rotational axis of the second rotary body is provided in parallel to a rotational axis of the third rotary body, and the first rotary body is provided between the rotational axis of the second rotary body and the rotational axis of the third rotary body.

7. An absolute encoder for determining a rotation amount of a main shaft over a plurality of rotations, the absolute encoder comprising:

at least one rotary body rotating together with a rotation of the main shaft;

a magnet rotating integrally with the rotary body; and a plurality of rotary sensors detecting magnetic poles of the magnet to output detection signals having sinusoidal waveforms, each sinusoidal waveform having a different phase, wherein:

the at least one rotary body includes a first rotary body rotating integrally with the main shaft and a third rotary body rotating together with a rotation of the first rotary body, the absolute encoder further comprises a first angular sensor to detect a rotational angle of the first rotary body, the magnet is arranged in the third rotary body, the at least one rotary body includes a second rotary body arranged between the first rotary body and the third rotary body, the absolute encoder further comprises a second angular sensor to detect a rotational angle of the second rotary body, the second rotary body reduces a rotational speed at a first speed reduction ratio with respect to the first rotary body, the third rotary body reduces a rotational speed at a second speed reduction ratio with respect to the second rotary body, the second rotary body includes another magnet rotating integrally with the second rotary body, and when a space is divided into two regions by a plane perpendicular to a rotational axis of the second rotary body and including a rotational axis of the first rotary body, the another magnet is arranged in the region of the two regions, in the region the magnet being not arranged.

8. An absolute encoder for determining a rotation amount of a main shaft over a plurality of rotations, the absolute encoder comprising:

a first acquisition mechanism acquiring a rotational angle of a first rotary body rotating integrally with the main shaft;

a second acquisition mechanism acquiring a rotational angle of a second rotary body, the second rotary body reducing a rotational speed at a first speed reduction ratio with respect to the first rotary body, the second rotary body reducing a rotational speed at a fourth speed reduction ratio with respect to an intermediate rotary body, the intermediate rotary body reducing a rotational speed at a third speed reduction ratio with respect to the first rotary body;

a third acquisition mechanism detecting magnetic poles of a magnet, the magnet reducing a rotational speed at a second speed reduction ratio with respect to the second rotary body, and acquiring a plurality of detection signals having sinusoidal waveforms, each sinusoidal waveform having a different phase;

a first determination element determining a rotational frequency of the first rotary body according to the acquired rotational angle of the second rotary body and the acquired detection signals; and a second determination element determining a rotation amount of the main shaft according to the acquired rotational angle of the first rotary body and the determined rotational frequency of the first rotary body.

9. A method for determining a rotation amount of a main shaft over a plurality of rotations, the method comprising:

acquiring a rotational angle of a first rotary body rotating integrally with the main shaft;

acquiring a rotational angle of a second rotary body, the second rotary body reducing a rotational speed at a first speed reduction ratio with respect to the first rotary body, the second rotary body reducing a rotational speed at a fourth speed reduction ratio with respect to an intermediate rotary body, the intermediate rotary body reducing a rotational speed at a third speed reduction ratio with respect to the first rotary body;

detecting magnetic poles of a magnet, the magnet reducing a rotational speed at a second speed reduction ratio with respect to the second rotary body, and acquiring a plurality of detection signals having sinusoidal waveforms, each sinusoidal waveform having a different phase;

determining a rotational frequency of the first rotary body according to the acquired rotational angle of the second rotary body and the acquired detection signals; and determining a rotation amount of the main shaft according to the acquired rotational angle of the first rotary body and the determined rotational frequency of the first rotary body.

\* \* \* \* \*